US007584250B1

(12) United States Patent  (10) Patent No.: US 7,584,250 B1
Chapman et al.  (45) Date of Patent: Sep. 1, 2009

(54) METHOD AND SYSTEM FOR DISTRIBUTING AN INVENTION DISCLOSURE OVER AN INTRANET

(75) Inventors: Connie Chapman, Manassas, VA (US); Melanie Langston, Manassas, VA (US)

(73) Assignee: Lockheed Martin Corp., Bethesda, MD (US)

( * ) Notice: Subject to any disclaimer, the term of this patent is extended or adjusted under 35 U.S.C. 154(b) by 496 days.

(21) Appl. No.: 09/596,629

(22) Filed: Jun. 19, 2000

Related U.S. Application Data

(60) Provisional application No. 60/141,306, filed on Jun. 28, 1999, provisional application No. 60/146,254, filed on Jul. 29, 1999.

(51) Int. Cl.
*G06F 15/16* (2006.01)
(52) U.S. Cl. .................... 709/206; 709/218
(58) Field of Classification Search ............... 709/206, 709/217–219; 345/751–752
See application file for complete search history.

(56) References Cited

U.S. PATENT DOCUMENTS

| | | | | |
|---|---|---|---|---|
| 5,247,661 A * | 9/1993 | Hager et al. | ............. | 707/104.1 |
| 5,276,869 A * | 1/1994 | Forrest et al. | ............... | 709/206 |
| 5,315,504 A * | 5/1994 | Lemble | ............. | 700/90 |
| 5,377,355 A * | 12/1994 | Hager et al. | ............... | 715/511 |
| 5,781,901 A * | 7/1998 | Kuzma | ............. | 707/10 |
| 5,790,790 A * | 8/1998 | Smith et al. | ............... | 709/206 |
| 5,794,236 A * | 8/1998 | Mehrle | ............. | 707/5 |
| 6,170,002 B1 * | 1/2001 | Ouchi | ............. | 709/206 |
| 6,243,722 B1 * | 6/2001 | Day et al. | ............... | 715/512 |
| 6,279,042 B1 * | 8/2001 | Ouchi | ............. | 709/240 |
| 6,356,909 B1 * | 3/2002 | Spencer | ............. | 707/10 |
| 6,370,567 B1 * | 4/2002 | Ouchi | ............. | 709/206 |
| 6,405,197 B2 * | 6/2002 | Gilmour | ............. | 707/5 |
| 6,442,594 B1 * | 8/2002 | Ouchi | ............. | 709/206 |
| 6,507,865 B1 * | 1/2003 | Hanson et al. | ............... | 709/206 |
| 6,539,404 B1 * | 3/2003 | Ouchi | ............. | 715/500 |
| 6,553,407 B1 * | 4/2003 | Ouchi | ............. | 709/206 |
| 6,584,466 B1 * | 6/2003 | Serbinis et al. | ............... | 707/10 |

(Continued)

OTHER PUBLICATIONS

Higley, Thomas, "Processing Messages Which Include an Address to Further Information", Oct. 10, 1996, World Intellectual Property Organization, WO 96/31826.*

(Continued)

*Primary Examiner*—Douglas B Blair

(57) ABSTRACT

A method for distributing an invention disclosure includes the steps of creating and submitting the invention disclosure over the intranet, with the invention disclosure being submitted by an inventor to at least one evaluator via e-mail with a hyperlink to the invention disclosure. Evaluation comments of the invention disclosure are transmitted by the evaluator via e-mail. The e-mail messages are easily transmitted and received between users within the intranet for providing notification and status of the invention disclosure. The hyperlinks embedded within selected e-mail messages allows a user to access the invention disclosure to provide a user friendly and efficient method of distributing an invention disclosure within an organization or company. The method also includes the steps of creating a profile of the invention disclosure based upon a technical area relating to the invention disclosure in response to accessing associated personnel information of the inventor, and transmitting a first notification message via e-mail to a first group of users based upon the created profile. The first notification message includes a hyperlink to the invention disclosure.

38 Claims, 47 Drawing Sheets

U.S. PATENT DOCUMENTS

| | | | |
|---|---|---|---|
| 6,643,663 B1 * | 11/2003 | Dabney et al. | 707/102 |
| 6,678,705 B1 * | 1/2004 | Berchtold et al. | 707/204 |
| 6,704,906 B1 * | 3/2004 | Yankovich et al. | 715/505 |
| 6,763,496 B1 * | 7/2004 | Hennings et al. | 715/501.1 |
| 6,820,094 B1 * | 11/2004 | Ferguson et al. | 707/200 |
| 6,918,082 B1 * | 7/2005 | Gross et al. | 715/511 |
| 6,961,756 B1 * | 11/2005 | Dilsaver et al. | 709/205 |
| 7,165,213 B1 * | 1/2007 | Busey | 715/500.1 |
| 7,496,632 B2 * | 2/2009 | Chapman et al. | 709/206 |

OTHER PUBLICATIONS

Calderone, A, "Practical Tips for Obtaining Patent Protection", Electro '96 Professional Program, Proceedings, Apr. 30-May 2, 1996, pp. 49-55.*

* cited by examiner

Invention Disclosure Form continued

Please provide an abstract of your invention:

Divulgation Notice

Protection of foreign and domestic patent rights is increasingly significant to _____. In general, if _____ files a patent application in the United States before there is any divulgation of a corresponding invention on a non-confidential basis, foreign patent rights will be preserved, but if the patent application is filed after a divulgation, foreign patent rights will be lost even though a United States patent may still be obtainable if the application is filed within a year of the divulgation. Accordingly, we ask that you answer the following questions. If the answer is Yes to any questions, please provide details in the "Critical Dates Comment" block below the questions. Please advise the intellectual property attorney if the answer to any question changes before filing of the patent application.

Critical Date Information

Estimated date invention reduced to practice (mm/dd/yyyy):

Invention used in product previously, presently, or in the future?  ○ Yes ○ No

If so, Product Name?

Has a product, including the invention or made with the invention, been sold or offered for sale??  ○ Yes ○ No If so, estimate when (mm/dd/yyyy)?

If the invention pertains to a process, have any steps been taken to employ the process commercially (e.g. for product production)?  ○ Yes ○ No

FIG. 8

Invention Disclosure Form continued

| | | |
|---|---|---|
| Has the invention been described in an electronic or printed publication, or disclosed in a talk or paper presented at a public meeting? | ○ Yes ○ No | |
| If so, estimate when (mm/dd/yyyy)? | | ← 84g |
| If so, where? | | ← 84h / 84i |
| Has the invention been publicly demonstrated or used? | ○ Yes ○ No | ← 86a |
| If so, estimate when (mm/dd/yyyy)? | | ← 86b |
| If so, where? | | ← 86c |
| Has the invention been otherwise described to persons who are not employees of Lockheed Martin (e.g. to vendors or customers)? | ○ Yes ○ No | ← 86d |
| If so, estimate when (mm/dd/yyyy)? | | ← 86e |
| If so, where? | | ← 86f |
| If so, was the invention disclosed under a Proprietary Information Exchange Agreement? | ○ Yes ○ No | ← 86g |
| If there has been no public use, sale, divulgation (e.g. publication), is any of these now contemplated? | ○ Yes ○ No | ← 86h |

FILE NUMBER: ___F499-021___ (for office use only)
TODAYS DATE: _____   SUBMISSION DEADLINE: _____
           CLASSIFICATION:
     None___ Confidential___ Internet Use Only___ Other_____(specify)
TITLE: _____

____TYPE: Abstract_____Paper_____(conference)Article_____(publication)
     Presentation_____(charts only)Book_____ White Paper_____
Has there been previous publication(s) of the Proposed Material,___Yes___No, if so
please identify either by title or file number of paper previously submitted. If abstract has
been submitted earlier please use the same file number to have final publication reviewed.

|  | 1ST AUTHOR | 2ND AUTHOR |
|---|---|---|
| NAME: | _____ | _____ |
| SERIAL NO: | _____ | _____ |
| INTERNAL ADDRESS: | _____ | _____ |
| TELEPHONE: | _____ | _____ |
| E-MAIL ADDRESS: | _____ | _____ |
| ORGANIZATION: | _____ | _____ |

FIG. 46

FULL TITLE OF CONFERENCE/PUBLICATION: _____

CONFERENCE/PUBLICATION DATE: _____
CONFERENCE LOCATION: _____
CONFERENCE SPONSOR: _____

FIG. 47

PLEASE IDENTIFY A TECHNICAL PEER REVIEWER
OR SUBJECT MATTER EXPERT: _____

INTERNAL ADDRESS: _____  TELEPHONE: _____

E-MAIL ADDRESS : _____

Does the paper relate to <u>any</u> Government contract?*  Yes: _____  No: _____

If YES, state contract number(s): _____ and secure Contract Administrator's confirmation that advance customer approval is <u>not</u> required for publication.
      CONTRACT TITLE : _____

CONTRACT ADMINISTRATOR: _____  PHONE: _____

Any related INVENTION Disclosures or PATENTS?  Yes: _____  No: _____
    If YES, Explain:

Any unique CONCEPTS relating to a material, process, device or system?
    Yes: _____  No: _____

FIG. 48

METHOD AND SYSTEM FOR DISTRIBUTING AN INVENTION DISCLOSURE OVER AN INTRANET

RELATED APPLICATIONS

This application is based upon prior filed copending provisional application Ser. No. 60/141,306 filed Jun. 28, 1999, and copending provisional application Ser. No. 60/146,254 filed Jul. 29, 1999, the entire contents of each of which are incorporated herein by reference.

FIELD OF THE INVENTION

The present invention relates to the field of data processing, and, more particularly, to a method and system for processing an invention disclosure.

BACKGROUND OF THE INVENTION

Traditional patent review processes within large companies initially requires an inventor to mail a paper copy of an invention disclosure to the intellectual property (IP) department. Upon receipt of the invention disclosure, an IP administrator assigns a disclosure number and forwards a copy of the invention disclosure to an evaluation committee. Members of the evaluation committee vary depending on the technical or functional subject matter of the invention. A recommendation by the evaluation committee is then mailed back to the IP administrator.

The recommendation typically includes one of the following: perform a patent search, publish, close, or protect as a trade secret. As an alternative, the recommendation can bypass the patent search and go directly into a recommendation of preparing and filing of a patent application.

The above described process is labor intensive. That is, all correspondence between the inventors, the intellectual property department, the evaluators, and other necessary parties are self initiated. Since the primary coordinator for the invention disclosure process is typically the IP administrator, much of the effort in distributing this information is placed upon this person. The IP administrator must assign the disclosure number, send out notification letters to applicable individuals that an invention disclosure has been submitted, and track the entire overall process from start to finish, which can be a time consuming task.

Attempts have been made to automate an invention disclosure process. For instance, U.S. Pat. No. 5,377,355 to Hager et al. discloses an automation of procedures in a local area network (LAN) environment. The procedures are automated in a data processing system with regard to the disclosures stored therein. Another example of automating the invention disclosure process in a local area network (LAN) environment is disclosed in U.S. Pat. No. 5,276,869 to Forrest et al. A selective review and electronic corroboration of invention disclosures within a distributed data processing system are disclosed.

Yet another method of an automated invention disclosure process is a program that operates on a mainframe computer. The program includes a set of virtual machine programs that operate on the mainframe for automating the invention disclosure process. These programs include a first program for inventors, a second program for the intellectual property department, and a third program for the review committees. The first program allows inventors to create invention disclosures on-line and submit the disclosure to the intellectual property department. The second program automatically assigns the next disclosure number, assigns a functional area and attorney, and sends the information disclosure to a predetermined list of committee members. The third program allows review committee members to view and print the invention disclosure. After the committee members have read the invention disclosure, members vote on the disclosure and the third program sends an electronic ballot to the chairperson of the committee.

Unfortunately, this program is cumbersome and difficult to follow. All text to be included in the invention disclosure must be entered directly into the system. Moreover, entry of text requires the user to know a prescribed set of coded instructions, which is not user friendly for someone unfamiliar with the instruction codes. Furthermore, a charge is incurred to the program or functional area based upon the input/output usage initiated by the user in that particular area.

Despite the development of these invention disclosure processes, there is still a need for a user friendly invention disclosure process that automatically distributes electronic documents within a data processing system.

SUMMARY OF THE INVENTION

In view of the foregoing background, it is therefore an object of the present invention to provide a method and associated system that improves the distribution of electronic documents within a data processing system.

This and other advantages, features and objects in accordance with the present invention are provided by a method for distributing an invention disclosure over an intranet. The method preferably includes the steps of creating and submitting an invention disclosure over the intranet, with the invention disclosure being submitted by an inventor to at least one evaluator via e-mail with a hyperlink to the invention disclosure, and transmitting evaluation comments of the invention disclosure by at least one evaluator via e-mail. The e-mail messages are easily transmitted and received between users within the intranet for providing notification and status of the invention disclosure. In addition, the hyperlinks embedded within selected e-mail messages allows a user to access the invention disclosure to provide a user friendly and efficient method of distributing an invention disclosure within an organization or company.

The intranet includes a plurality of users enrolled therein with each user having associated personnel information stored within the intranet, and the method also preferably includes the steps of creating a profile of the invention disclosure based upon a technical area relating to the invention disclosure in response to accessing associated personnel information of the inventor, and transmitting a first notification message via e-mail to a first group of users based upon the created profile. The first group of users are within the plurality of users and includes a technical review coordinator. The first notification message preferably has a hyperlink to the invention disclosure.

At least one evaluator is selected by the technical review coordinator. The method preferably includes the steps of submitting a recommendation of the invention disclosure by the technical review coordinator based upon the evaluation comments, and transmitting the recommendation of the invention disclosure via e-mail to the first group of users.

The step of transmitting the first notification message is responsive to submission of the invention disclosure. The profile preferably includes a functional manager of the inventor, a patent attorney, a technical review person, and a contracts person if the invention was developed under a government contract. Similarly, the first group of users preferably includes a technical review coordinator, a contract administrator if the invention was developed under a government contract, and an intellectual property administrator.

Another aspect of the present invention relates to an intranet for distributing an invention disclosure that includes a first software module for creating and submitting an invention disclosure over the intranet, with the invention disclosure being submitted by an inventor to at least one evaluator via e-mail with a hyperlink to the invention disclosure, and a second software module for transmitting evaluation comments of the invention disclosure by the at least one evaluator via e-mail.

The intranet includes a plurality of users enrolled therein with each user having associated personnel information stored within the intranet. The intranet also preferably includes a third software module for creating a profile of the invention disclosure based upon a technical area relating to the invention disclosure in response to accessing associated personnel information of the inventor, and a fourth software module for transmitting a first notification message via e-mail to a first group of users based upon the created profile. The first group of users are within the plurality of users and includes a technical review coordinator. The first notification message preferably includes a hyperlink to the invention disclosure.

The at least one evaluator is selected by the technical review coordinator. The intranet further preferably includes a fifth software module for submitting a recommendation of the invention disclosure by the technical review coordinator based upon the evaluation comments, and a sixth software module for transmitting the recommendation of the invention disclosure via e-mail to the first group of users.

BRIEF DESCRIPTION OF THE DRAWINGS

FIGS. 3-45 are user interface displays for the invention disclosure process in accordance with the present invention.

FIGS. 46-48 are user interface displays for a technical paper approval process in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
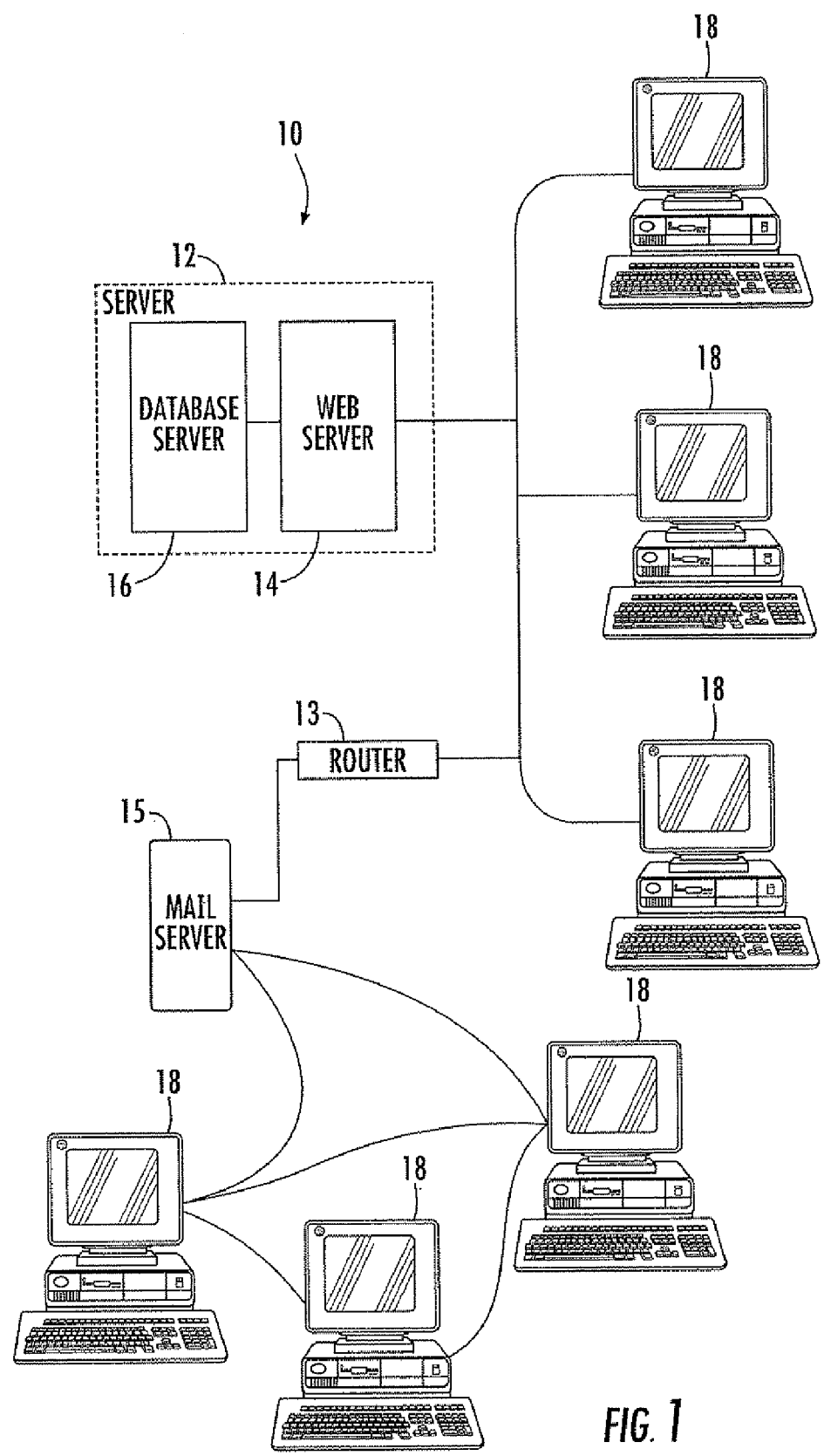
FIG. 1 is a schematic diagram of an intranet system used to implement an invention disclosure process in accordance with the present invention.

An invention disclosure process according to the present invention is implemented in an intranet 10, as shown in FIG. 1. This intranet 10 may be localized within a corporation or business site, or may even be configured to link more than one division of a corporation together. The intranet is separated from the rest of the internet by a firewall, which is a hardware/software combination that protects the intranet from an unauthorized user, as readily understood by one skilled in the art.

A key component of the intranet is an e-mail system and a web browser for implementing the invention disclosure process. The e-mail system may use normal internet e-mail addresses, except that it routes traffic within an organization so the e-mail need not travel outside the intranet. Internal routers 13 and mail servers 15 send the mail to other corporation employees via the intranet. E-mail that travels to and from the internet must go through the firewall. The invention disclosure process thus may also be implemented over the internet using an encrypted or secured connection. For instance, remote sites are able to upload information to the intranet database server 10.

E-mail messages are easily transmitted and received between users within the intranet 10 for providing notification and status of a particular invention disclosure. Furthermore, hyperlinks embedded within selected e-mail messages allow a user to access a particular invention disclosure, as will be described in greater detail below.

The intranet 10 offers access only to enrolled or authorized users. That is, each user requires a selected password to match their user name prior to viewing an invention disclosure document. A server 12 processes the method according to the present invention. In one embodiment, the server 12 includes a web or document server 14 that interfaces with a separate database server 16. Alternatively, the web server 14 and the database server 16 can be formed as a single server 12, wherein the server would include a hierarchical tree structure containing files pertaining to those stored in the database server. The server 12 is not limited to any particular operating system for implementing the invention disclosure process. Individual computers 18 are connected to the servers 12. In one embodiment, each personal computer 18 includes a web browser since the invention disclosure process is web-based.

Figure 2:
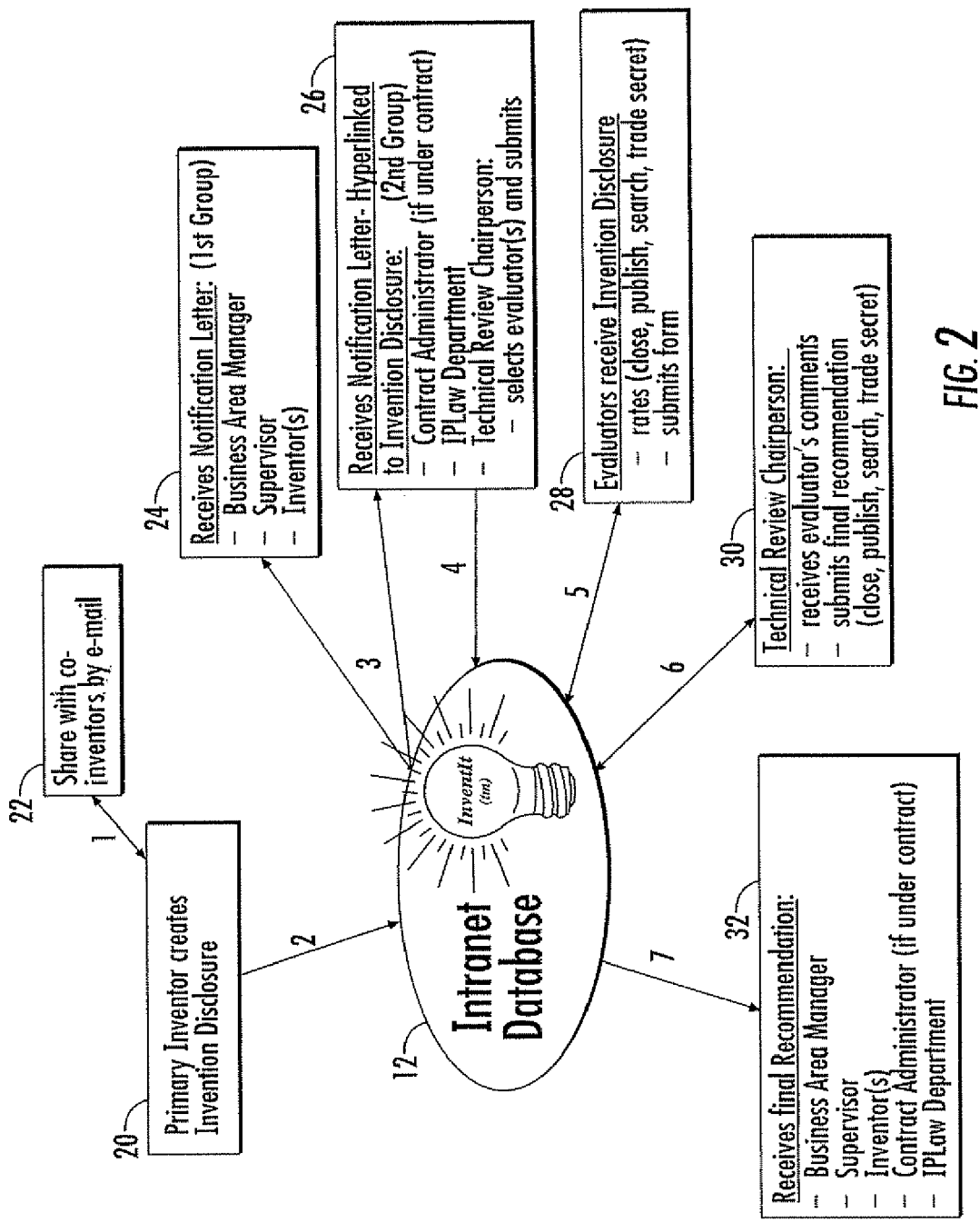
FIG. 2 is a high level flow chart illustrating how an invention disclosure is created and evaluated over an intranet in accordance with the present invention.

Information necessary for the invention disclosure process is stored within the database server 16. In one embodiment, the intranet 10 uses active server web pages instead of static web pages, as readily understood by one skilled in the art. The web server 14 thus uses the active server pages to interact with the database server 16 to extract the necessary information and construct each hypertext markup language (html) page to be provided to the user. Whenever a change is made to any of the displays of the invention disclosure forms, these displays are automatically updated by the web server 14 so that each time a user logs into the invention disclosure process, the web server 14 provides the updated pages. Referring now to FIG. 2, a high level flow chart illustrating how an invention disclosure is created and evaluated over an intranet 10 in accordance with the present invention will be described. From the start (Block 20), the primary inventor creates an invention disclosure using a template form provided by the server 12. Once the invention disclosure has been completed, the primary inventor has a number of available options which will be described in greater detail below.

One of these options is to share the invention disclosure with a co-inventor at Block 22. Selection of this option automatically causes an electronic mail (e-mail) message to be transmitted notifying the co-inventor to review and comment on the invention disclosure. The e-mail message to the co-inventor includes a hyperlink to the newly created invention disclosure. The co-inventor selects the hyperlink to access the invention disclosure for review. It is assumed that the co-inventor is an enrolled or authorized user. In other words, the co-inventor enters a password recognized by the server 12

Once the primary inventor is satisfied with the contents of the invention disclosure, the disclosure is then submitted to the server 12. In response, the server 12 automatically creates a profile of the invention disclosure. This profile is based on the functional and technical area relating to the invention disclosure. In one embodiment, the profile includes the functional manager of the primary inventor, an intellectual property representative (e.g., a patent attorney or a paralegal), a technical review person, and a contracts person if the invention was developed under government contract. The contracts person is associated with the inventor's business and technical areas. The profile also includes specific information relating to the primary inventor, such as the inventor's employee number, department number, building number, phone number and e-mail address. The created profile for the submitted invention disclosure is automatically stored in a preselected database. This database may be part of the server 12, or may be a separate database.

After the invention disclosure has been submitted and profiled, a first notification message is automatically transmitted via e-mail to a first group of users at Block 24. The intranet includes a plurality of users enrolled therein with each user having associated personnel information stored within the intranet. The first group of users are part of this plurality of users.

The first notification message states that the primary inventor has submitted an invention disclosure for evaluation. The first notification message may include a hyperlink to the invention disclosure. In other words, this first group of users are notified of this message. The first group of users is determined based upon the created profile of the invention disclosure document. In one embodiment, the first group of users includes the applicable business area manager, the supervisor of the primary inventor, and the primary inventor and co-inventors.

Simultaneous to creating the first notification message, a second notification message is created. The second notification message includes a hyperlink to the invention disclosure. This second notification message is transmitted via e-mail over the intranet to a second group of users at Block 26. The hyperlink allows the invention disclosure to be viewed by clicking the web browser on the hyperlink. The second group of users is also part of the plurality of users enrolled within the intranet.

The second group of users are determined based upon the created profile of the invention disclosure. In one embodiment, the second group of users includes a technical review coordinator, a contract administrator, and an administrator in the intellectual property department.

The technical review coordinator selects at least one evaluator to review and evaluate the submitted invention disclosure at Block 30. Once the server 12 receives a name of the evaluator, a third notification message is automatically created and transmitted via e-mail to this evaluator at Block 28. The third notification message also includes a hyperlink to the invention disclosure.

Evaluation comments generated and transmitted by the evaluator are provided to the server 12. These evaluation comments can then be reviewed by the technical review coordinator at Block 30. The technical review coordinator makes a final recommendation of the invention disclosure based upon the evaluation comments provided by the evaluator. If the technical review coordinator needs additional information, another evaluator could be selected to review and evaluate the invention disclosure. This final recommendation is automatically transmitted via e-mail to the first and second group of users at Block 32. The invention disclosure process is finished.

Referring now to FIGS. 3-44, one embodiment of display formats for the invention disclosure process will be described in detail. These display formats are viewed by the users on their individual computer 18. The actual creation of the display fields within each display will not be described, since the construction of web-based html pages are well known by one skilled in the art.

Figure 3:
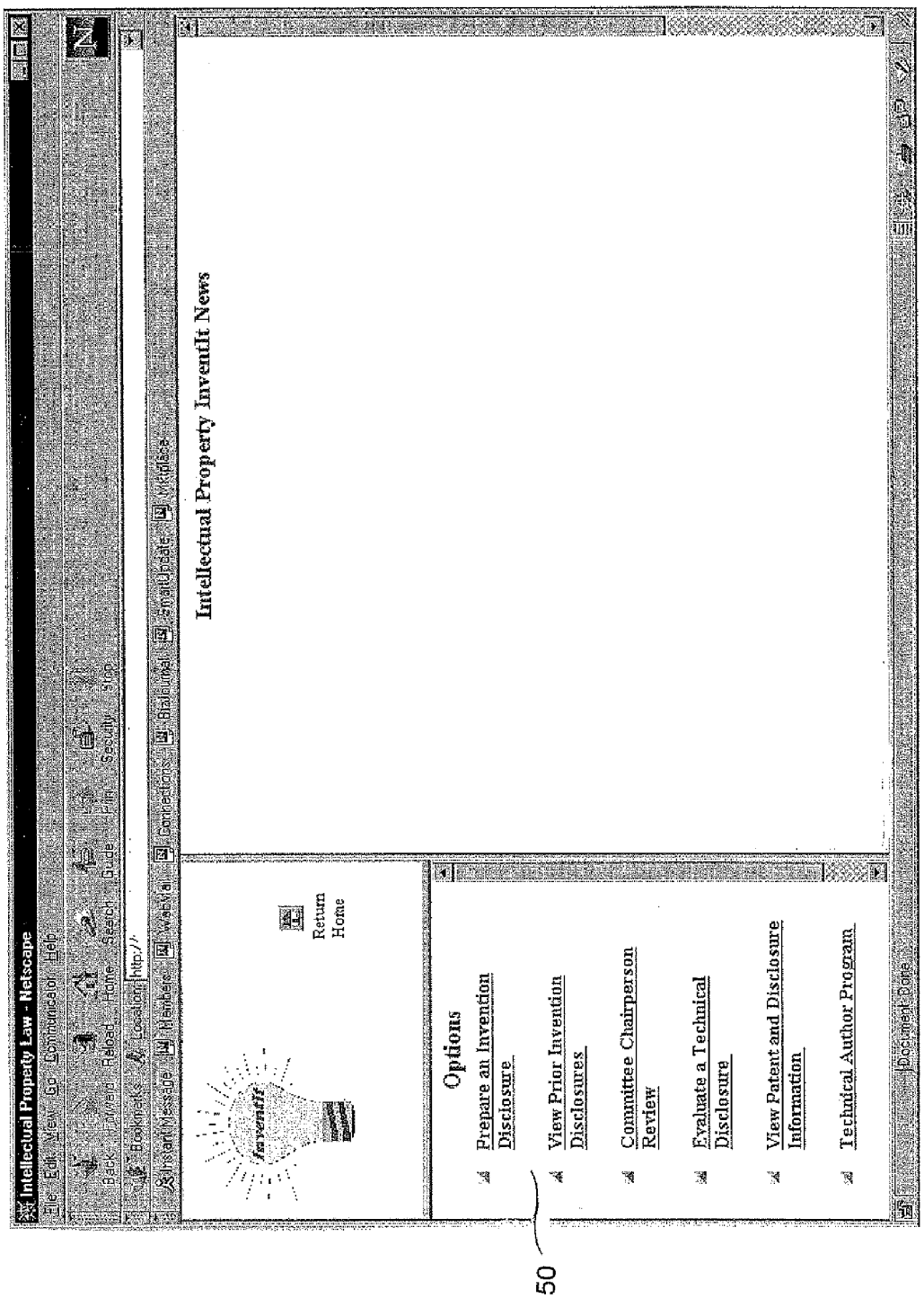

Since the invention disclosure process is set up within an intranet, security is established as to who can access, review and evaluate an invention disclosure. To create an invention disclosure, the primary inventor first accesses the start or home page, where the primary inventor will be prompted to enter a user name and password. A subsequent page will provide a list of options to the inventor, as best shown in FIG. 3. In one embodiment, these options include 1) prepare an invention disclosure, 2) view prior invention disclosures, 3) committee chairperson review, 4) evaluate a technical disclosure, 5) view patent and disclosure information, and 6) technical author program, as shown in display portion 50.

Figure 4:
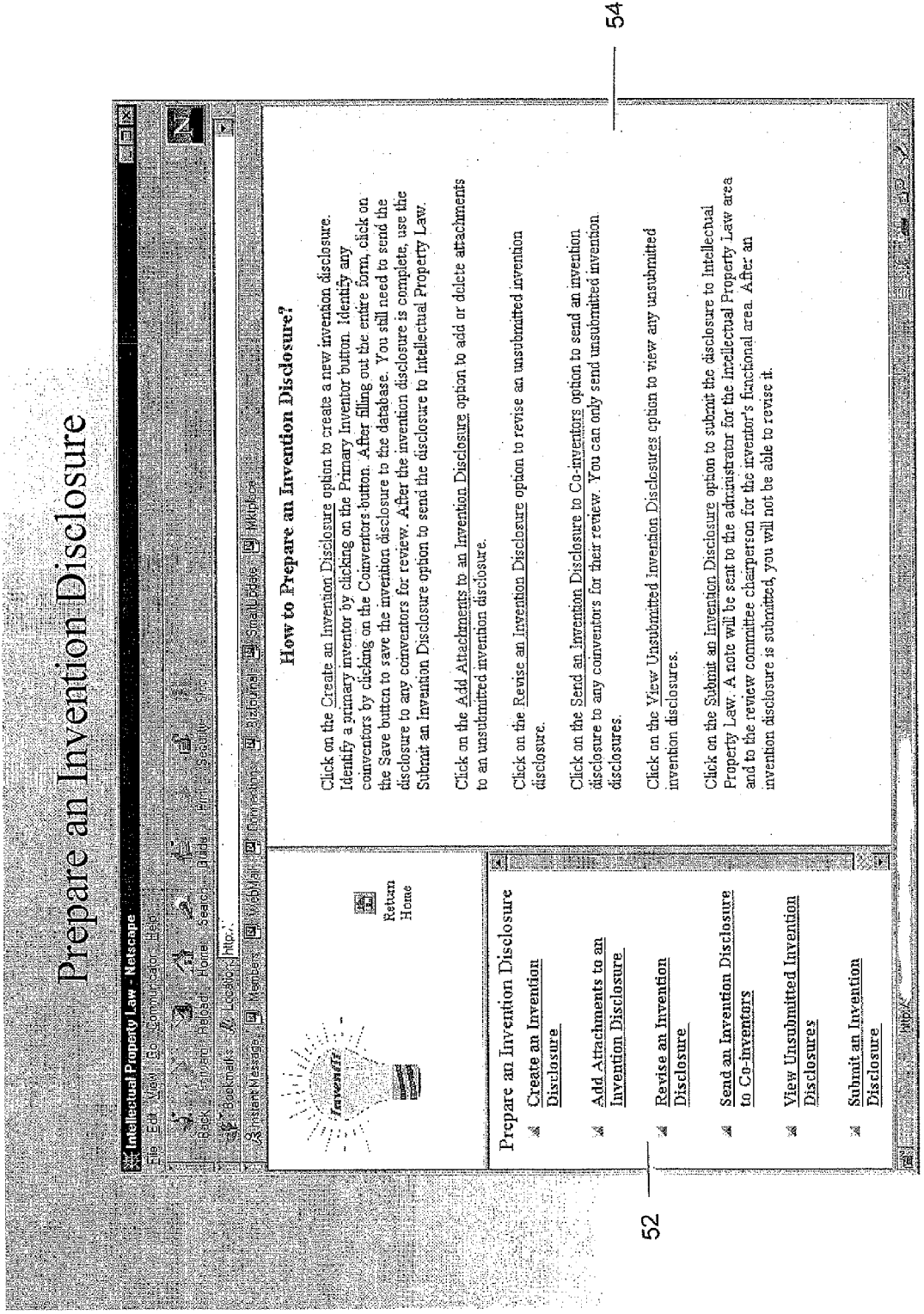
Figure 5:
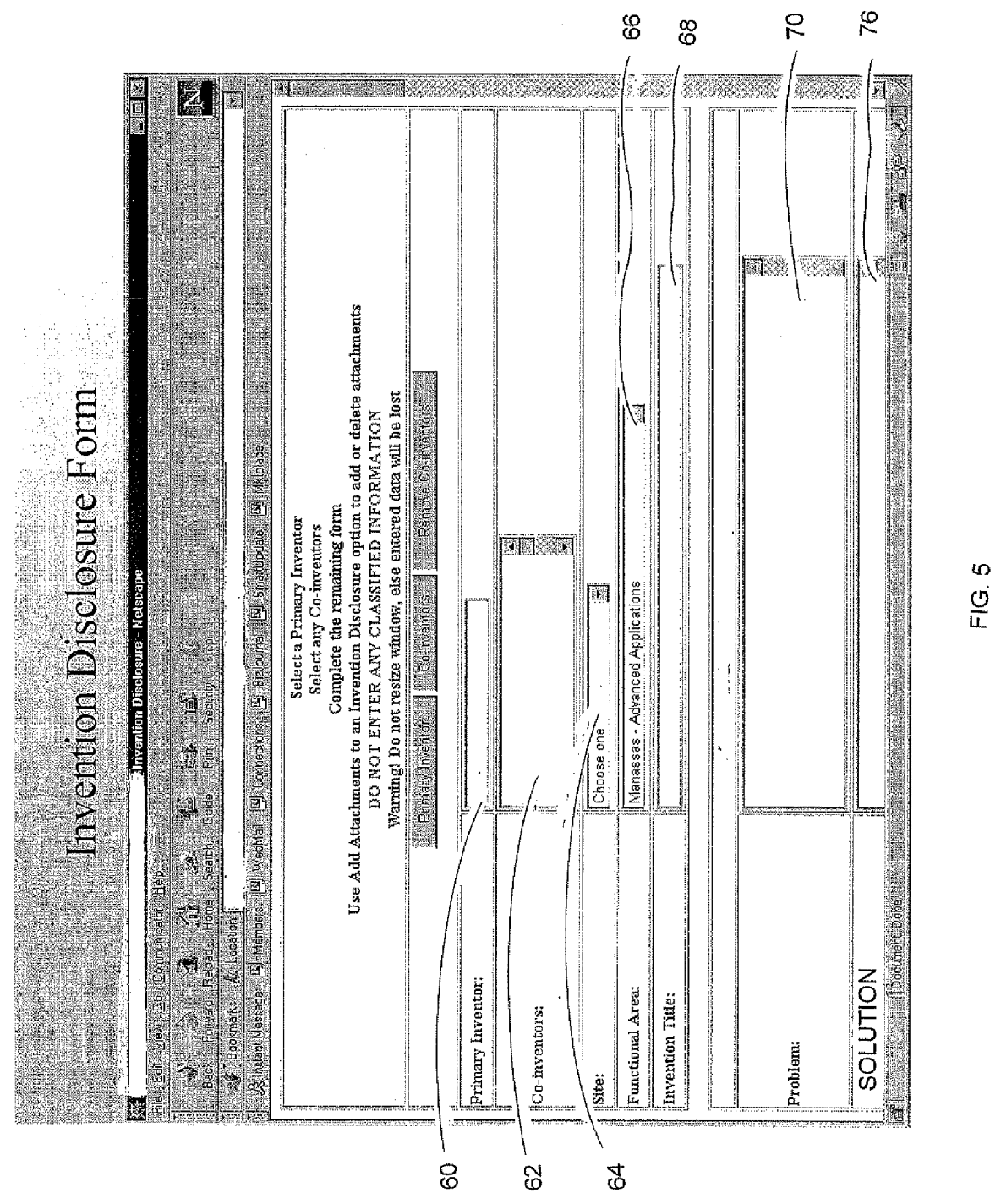

To create an invention disclosure, the inventor clicks on the text "prepare an invention disclosure" which causes a display to present a list of options relating to preparing an invention disclosure, as shown in FIG. 4. In one embodiment, these options include 1) create an invention disclosure, 2) add attachments to an invention disclosure, 3) revise an invention disclosure, 4) send an invention disclosure to co-inventors, 5) view unsubmitted invention disclosures, and 6) submit an invention disclosure, as shown in display portion 52. Narrative text to assist the primary inventor is displayed in display portion 54. After the primary inventor selects "create an invention disclosure," a blank invention disclosure form is displayed, as shown in FIG. 5.

Figure 6:
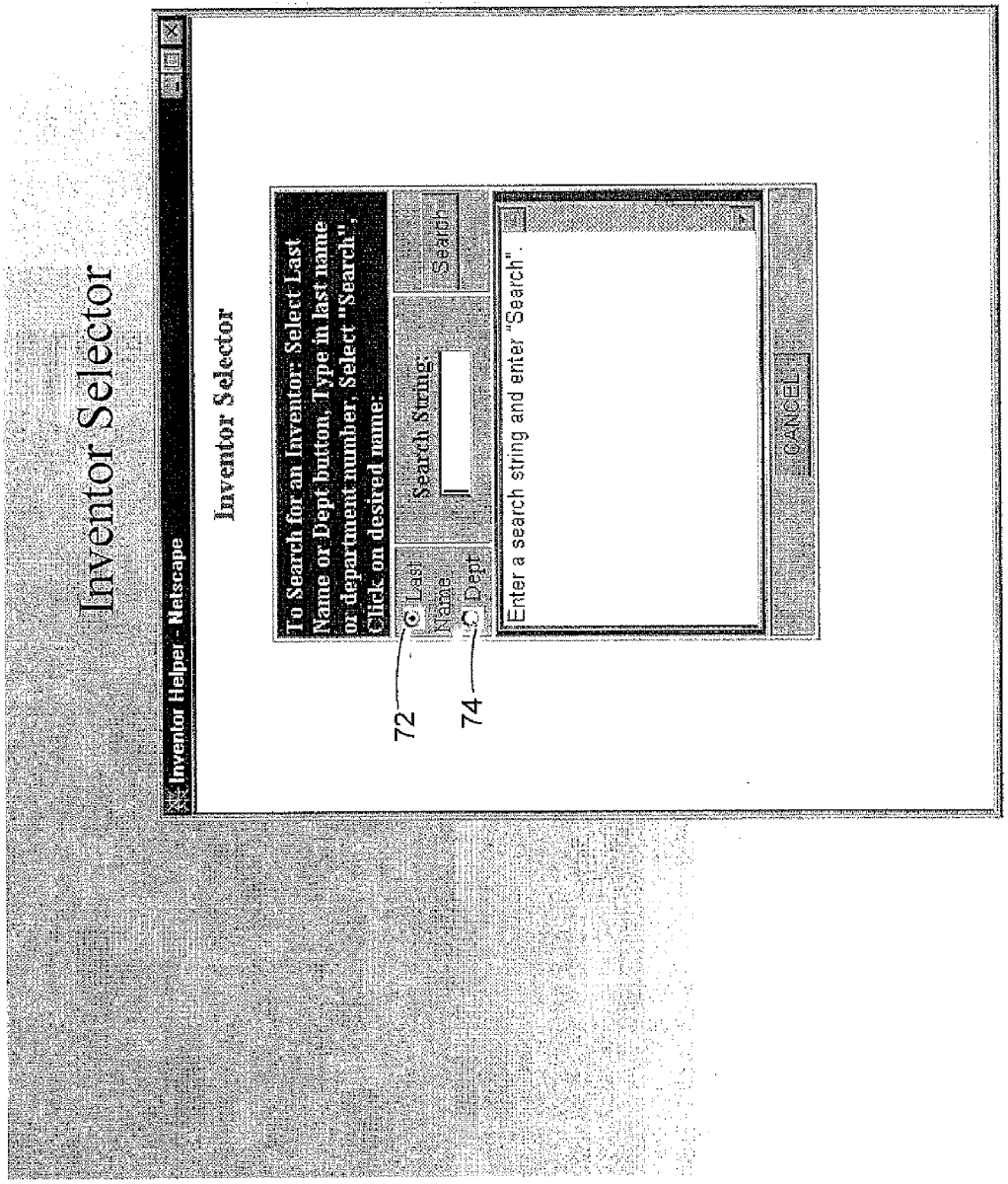

In the invention disclosure form, there are fields to enter specific information. When a primary inventor name has been entered in field 60, this name is compared against a database, such as an employee database. The same process is repeated for entering a co-inventor's name in field 62. The primary inventor also picks a site location in field 64, a functional area in field 66, and enters a title for the invention in field 68. An inventor's full name can also be found by selecting the last name field 72 or department number field 74 using a separate display screen, as shown in FIG. 6.

Figure 7:
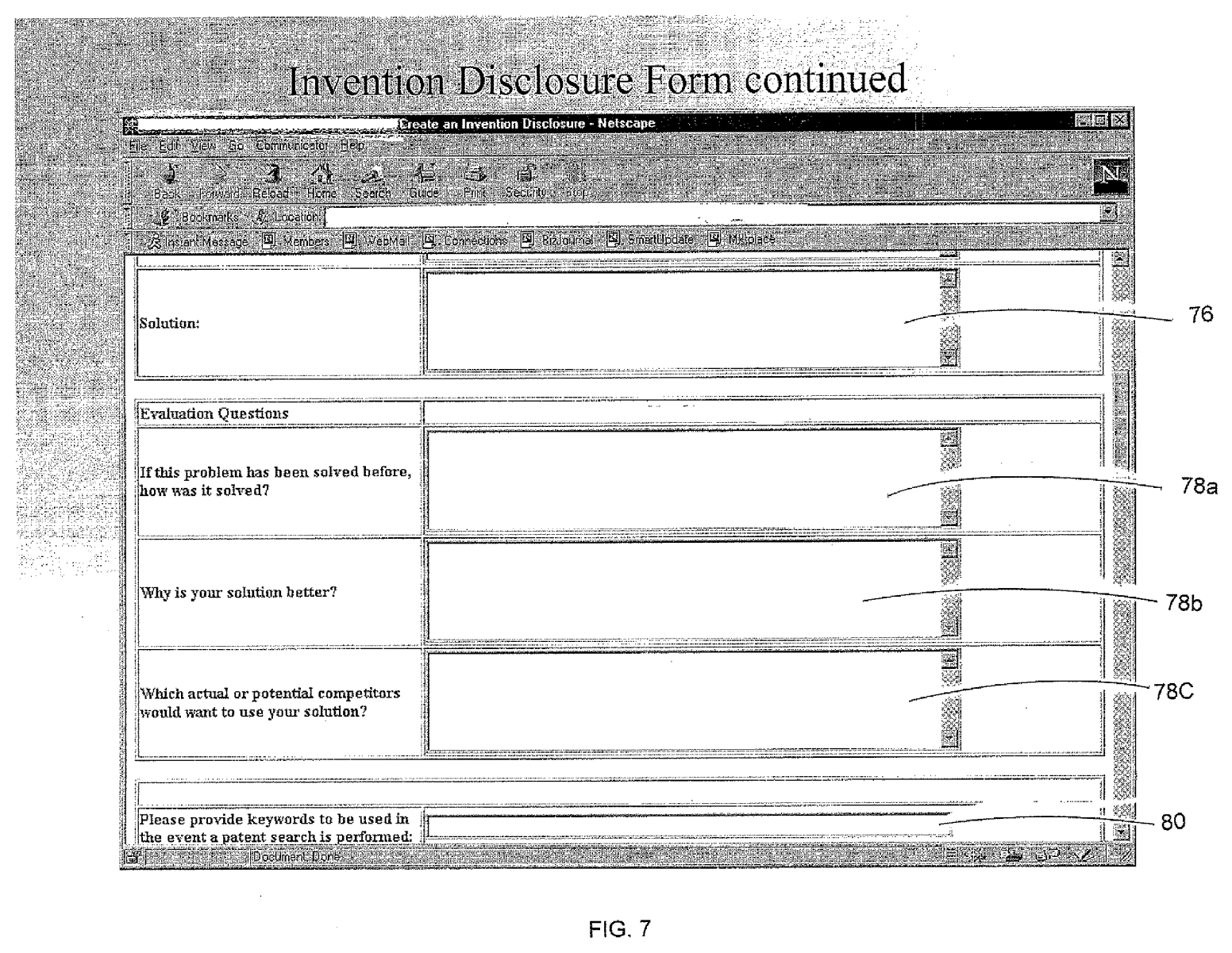

With respect to the invention disclosure form, the primary inventor describes the problem in field 70, and describes the solution in field 76. Other information to be provided includes a series of evaluation questions indicated by fields 78a-78c, as shown in FIG. 7. Keywords and an abstract of the subject matter of the invention are provided in respective fields 80 and 82.

Figure 10:
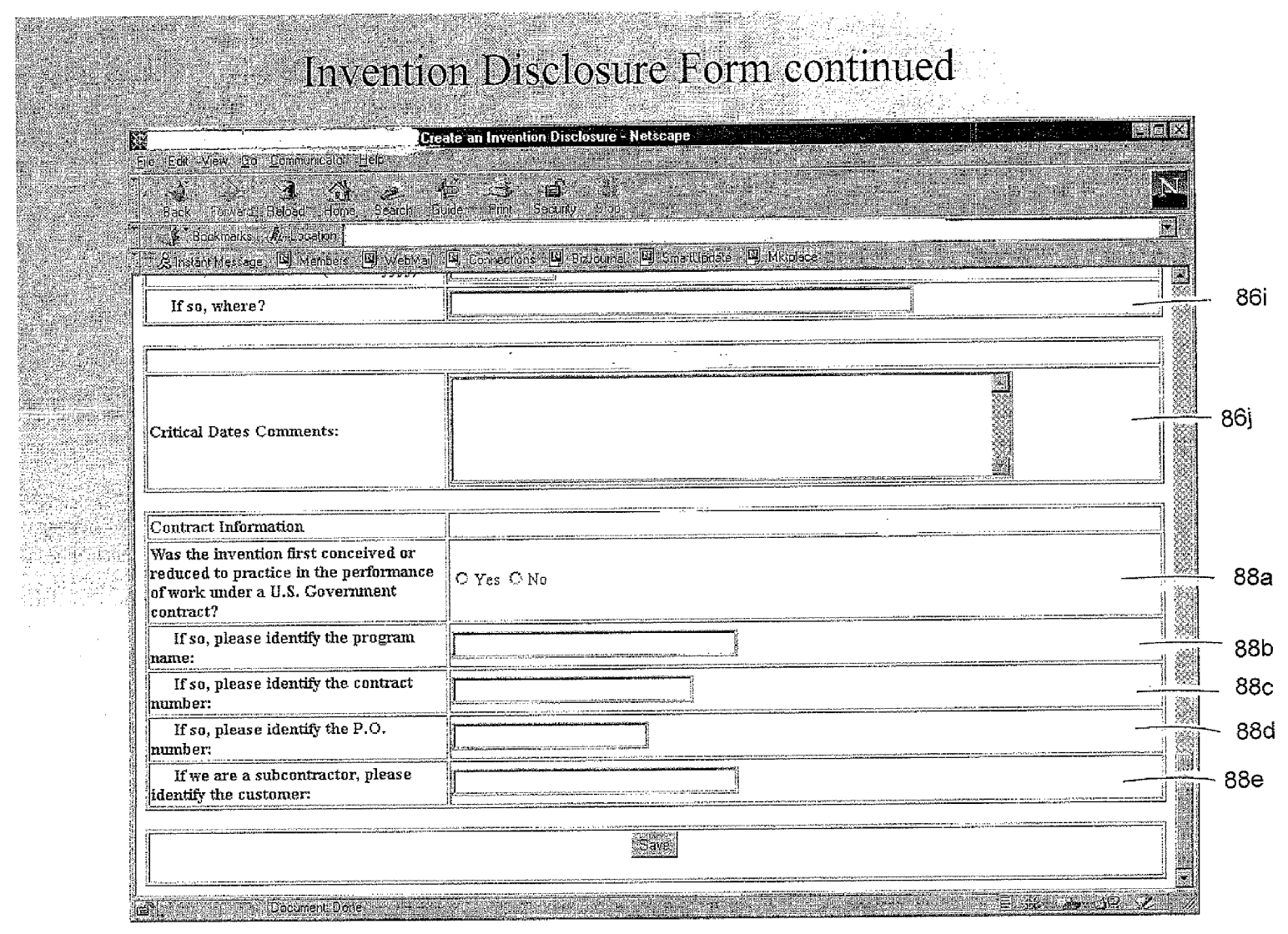

Referring to FIGS. 8 and 9, questions helpful to identifying a possible statutory bar date are answered in fields 84a-84i. In addition, several questions pertaining to establishing if proprietary information is involved is answered in fields 86a-86j, as shown in FIGS. 9 and 10. Contract information type questions are answered in fields 88a-88e to determine if the invention was developed under government funding.

Any of the information required for the invention disclosure as indicated in FIGS. 3-10 can be generated external to intranet, such as with a word processing program, and then imported into the applicable fields. Furthermore, a separate attachment can remain fixed to the invention disclosure if additional information is necessary as will be described below.

Figure 11:
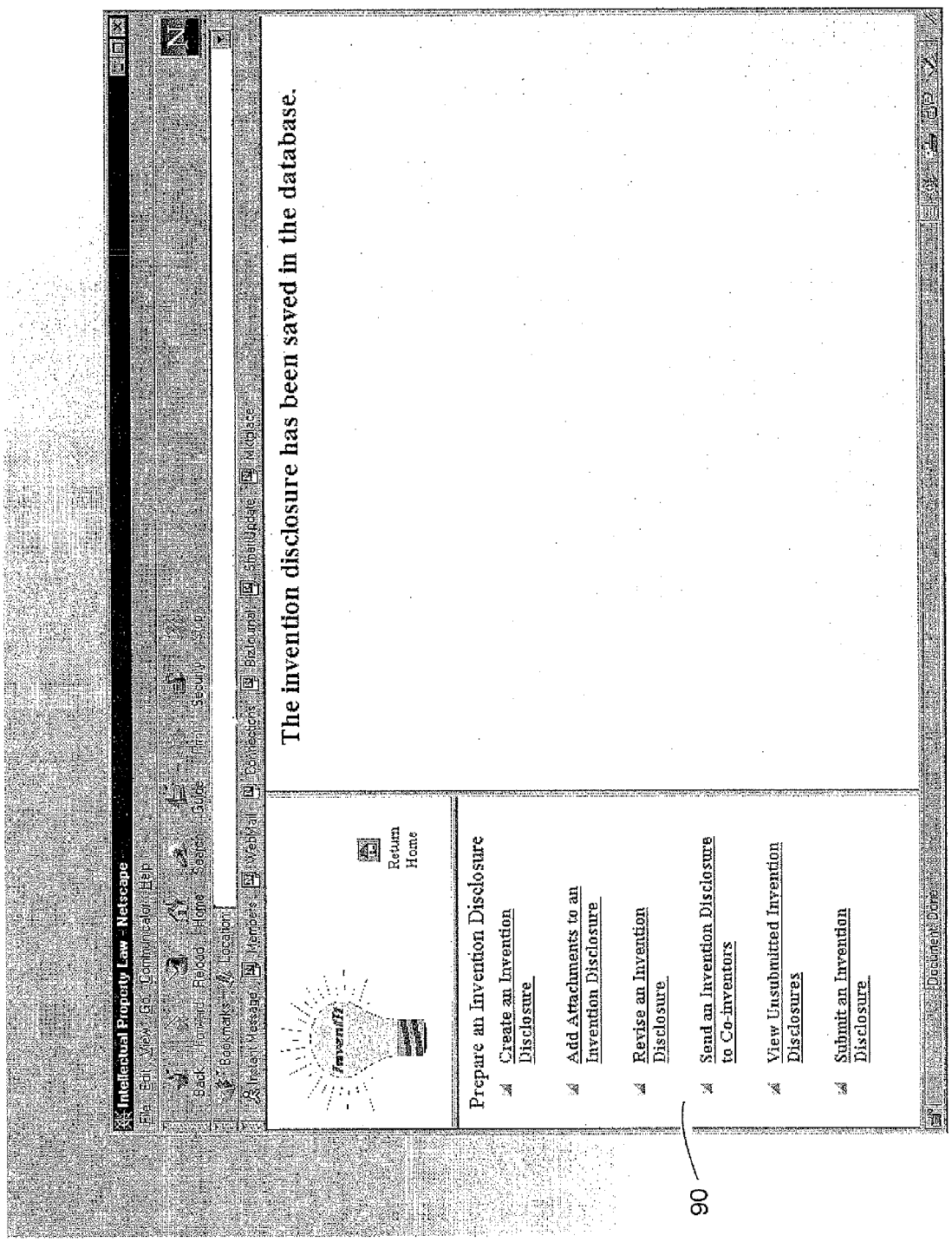

Also included within the invention disclosure form (not shown) is a comment section to allow the inventor to expand upon specific questions that may require an additional explanation. Once all the fields have been filled in, the invention disclosure can be saved, as shown in FIG. 11. As previously mentioned in reference to FIG. 3, the primary inventor has a list of options to choose from. These options are again listed after the invention disclosure has been saved, as shown in display portion 90 in FIG. 11.

Figure 12:
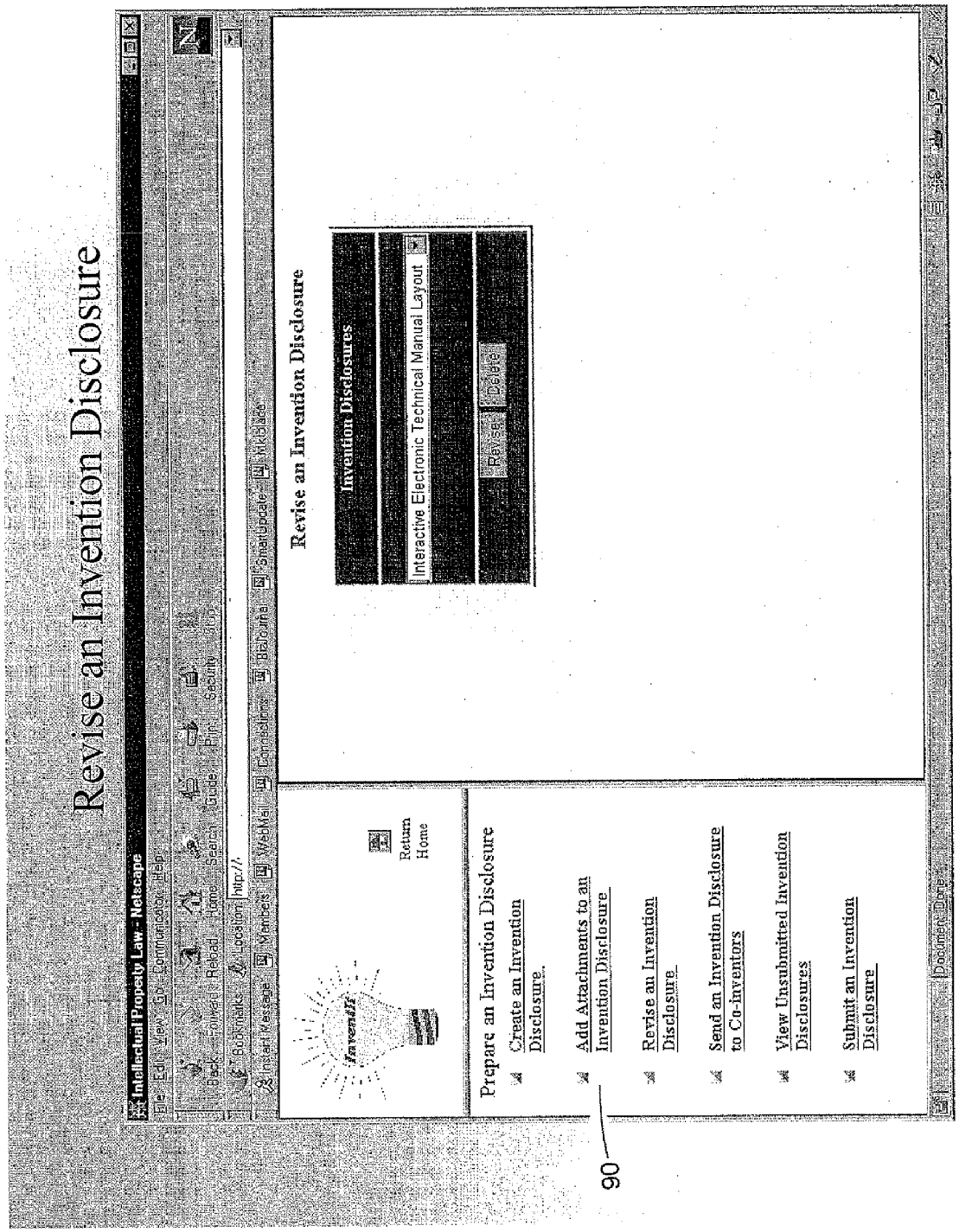
Figure 13:
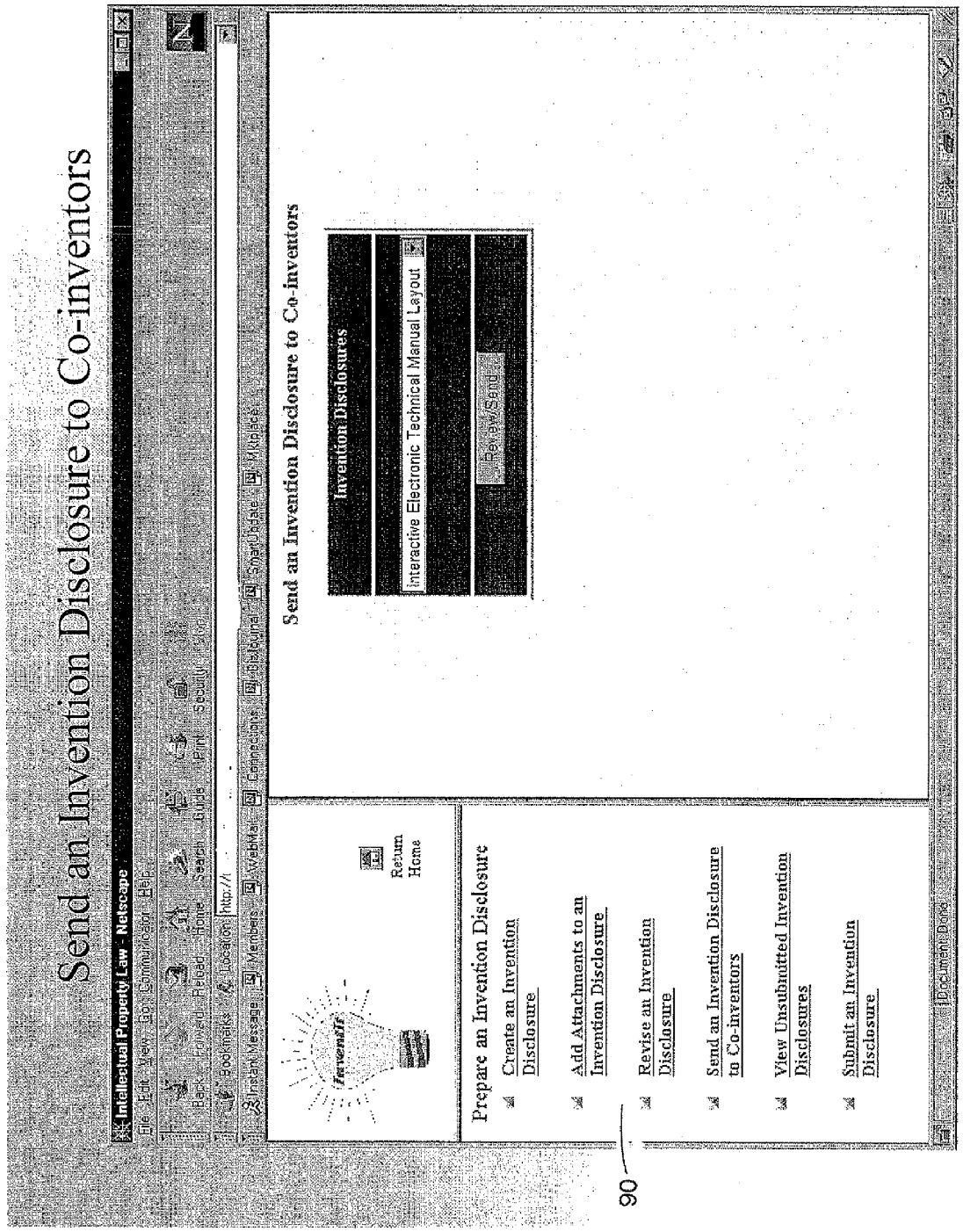
Figure 14:
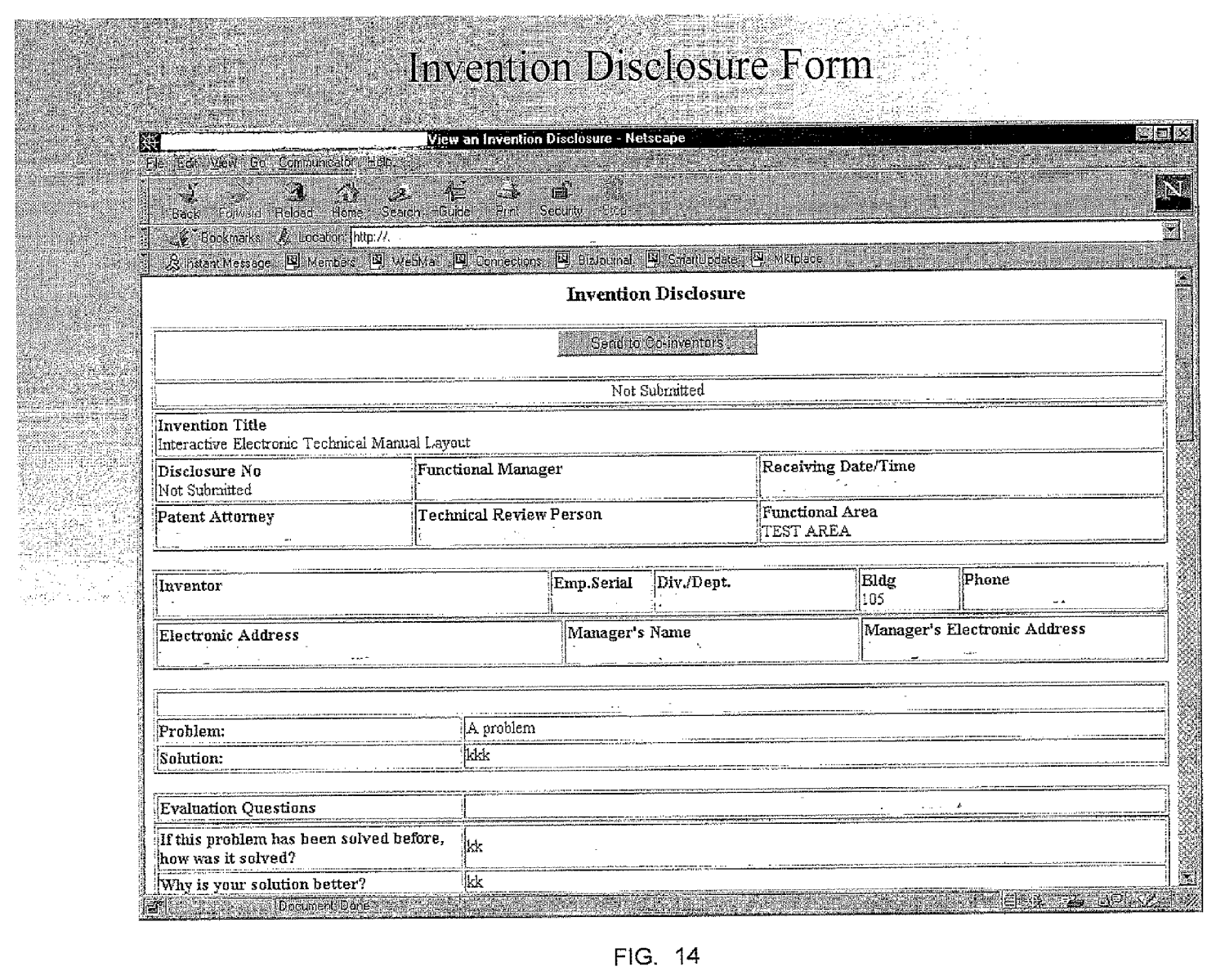
Figure 15:
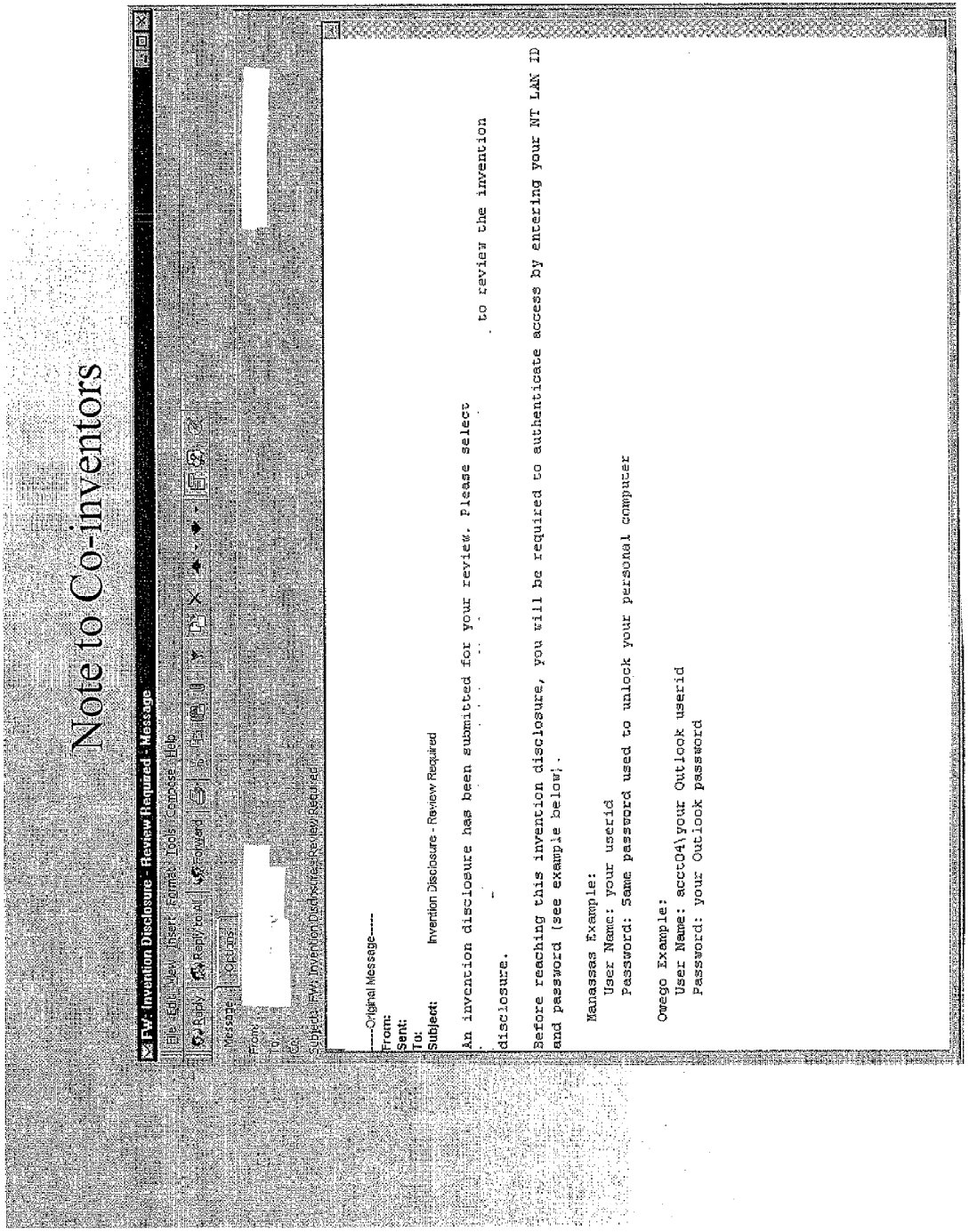
Figure 16:
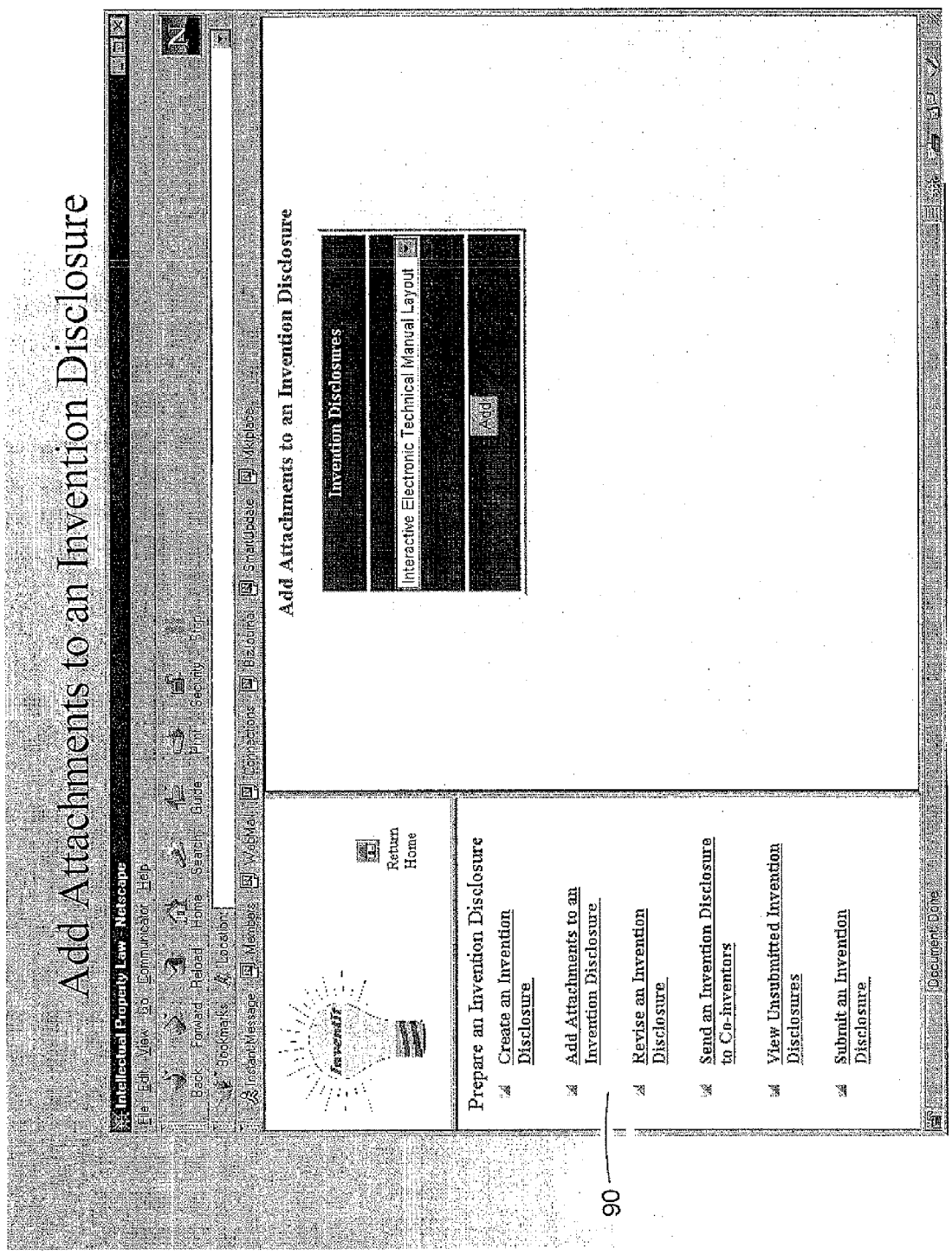
Figure 17:
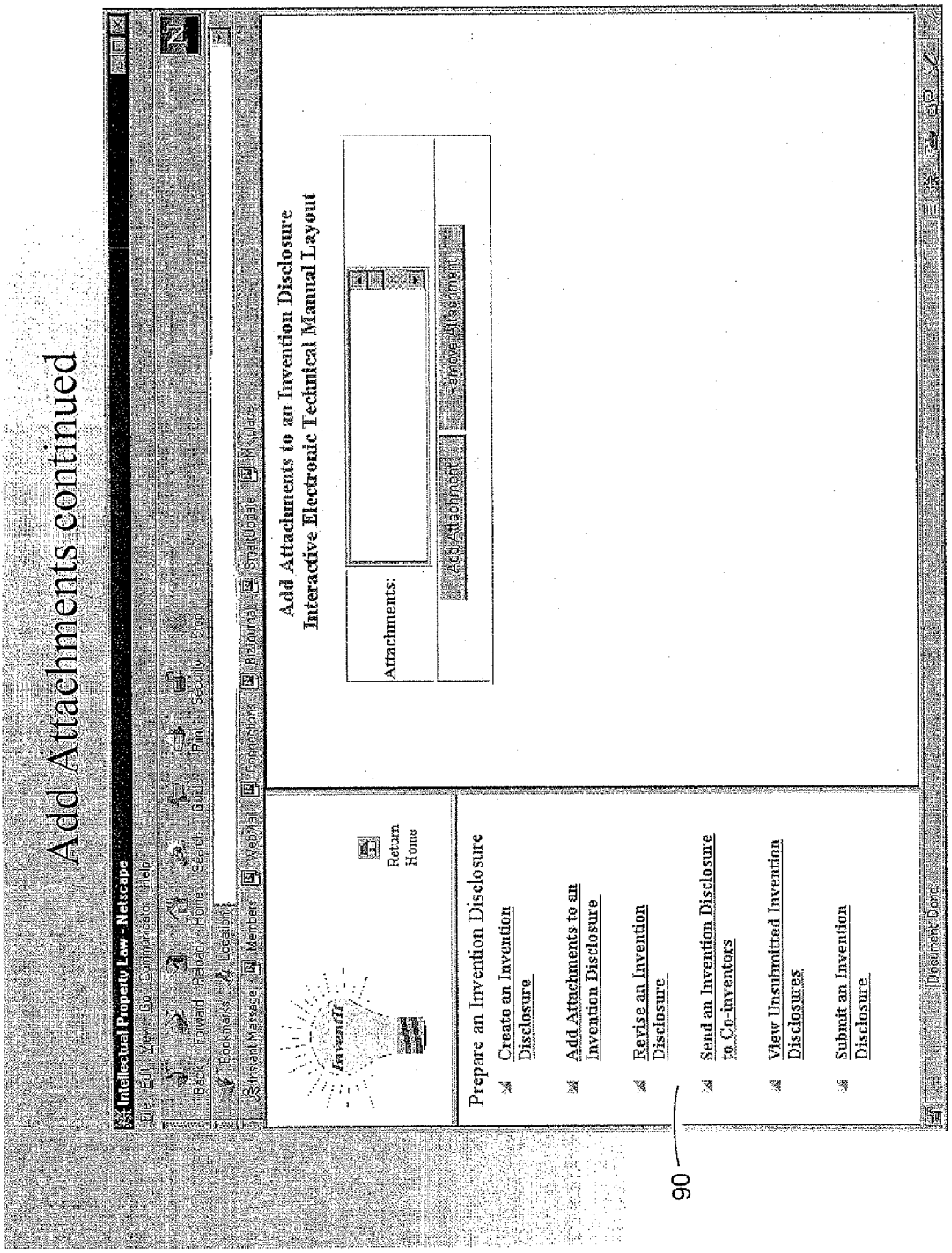
Figure 18:
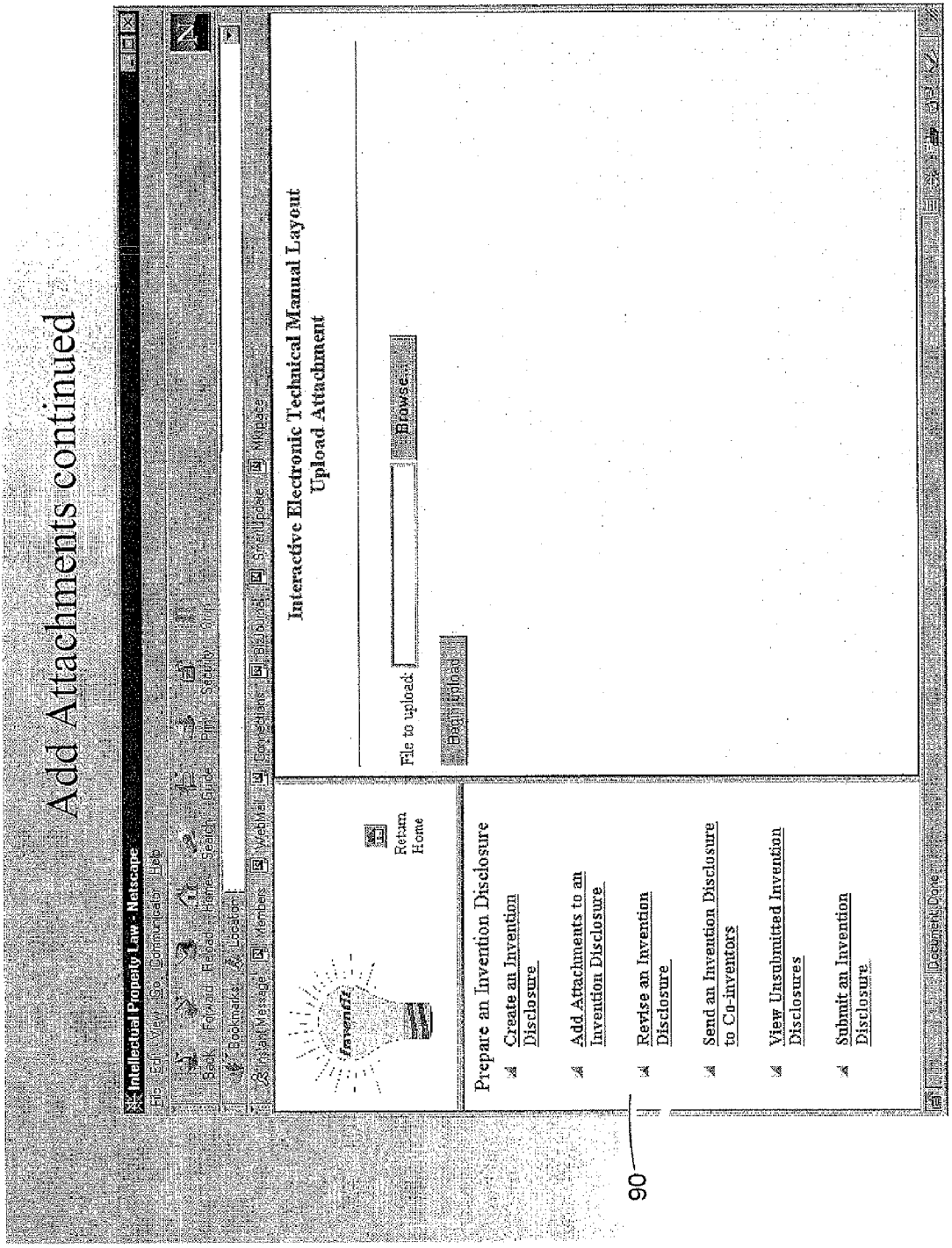
Figure 19:
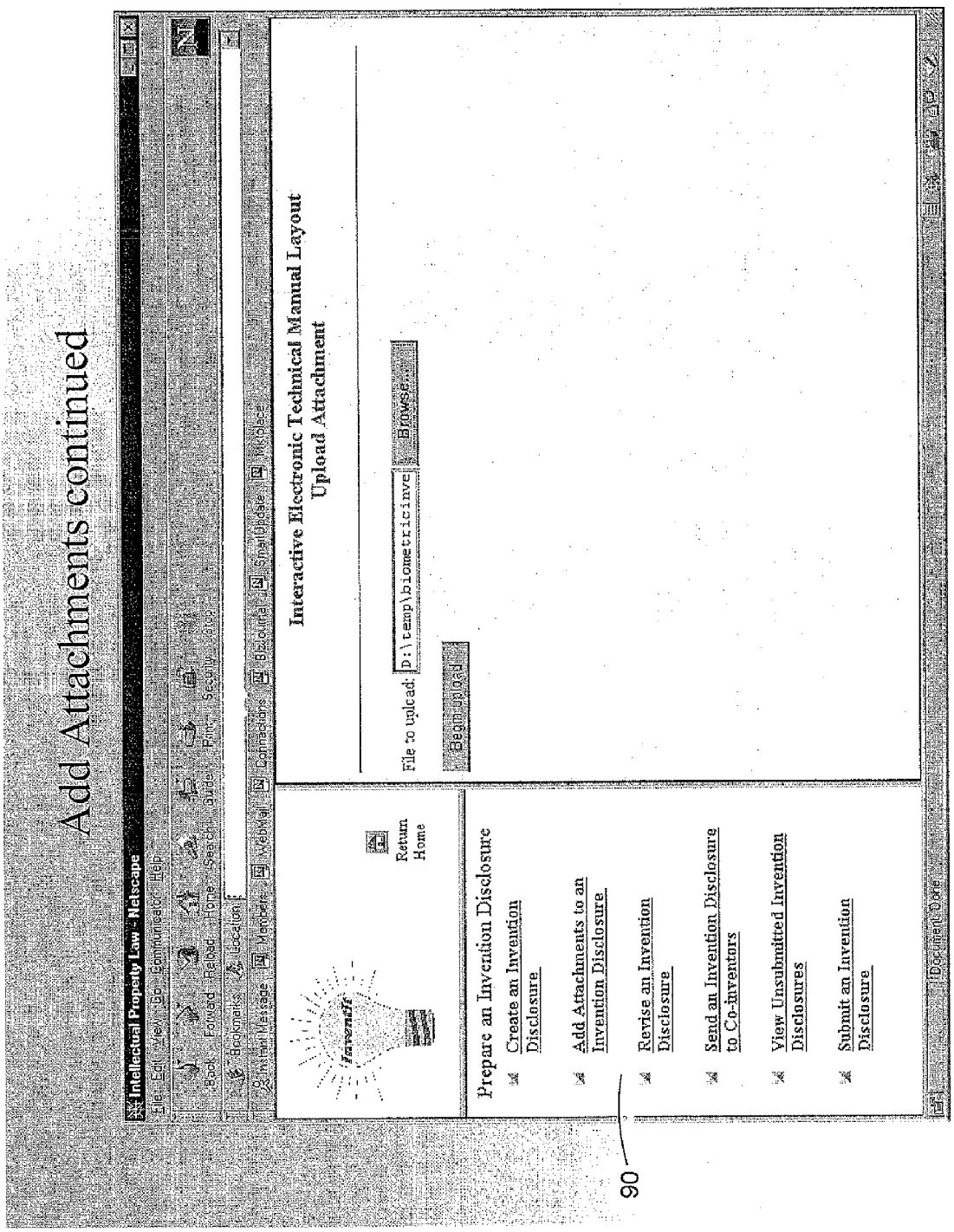

The invention disclosure can be modified as many times as necessary before being submitted. As previously stated, one of the options presented to the primary inventor is to revise the invention disclosure, as shown in FIG. 12. Another option is to send the invention disclosure to a co-inventor, as shown in FIGS. 13-14. This notice is sent via e-mail to the co-inventor and includes a hyperlink to the invention disclosure, as shown in FIG. 15. The co-inventor must enter his user name and password before viewing the invention disclosure.

Yet another option available to the primary inventor is to include an attachment. Attachments, such as word documents, power point presentations, etc. can be attached to the invention disclosure. The primary inventor selects the appropriate option as shown in display portion 90 in FIG. 11 to obtain a display for adding attachments, as shown in FIGS. 16-20. The primary inventor selects a file on his individual computer 18 and uploads the file to the server 12. Attachments can be made until the invention disclosure is submitted.

Comments provided by the co-inventor are sent to the primary inventor. The control is set up for the primary inventor to enter and amend the fields within the invention disclosure form. Once the disclosure has been submitted to the database, it can not be changed by the inventor. If necessary, the IP administrator can change the disclosure.

Figure 21:
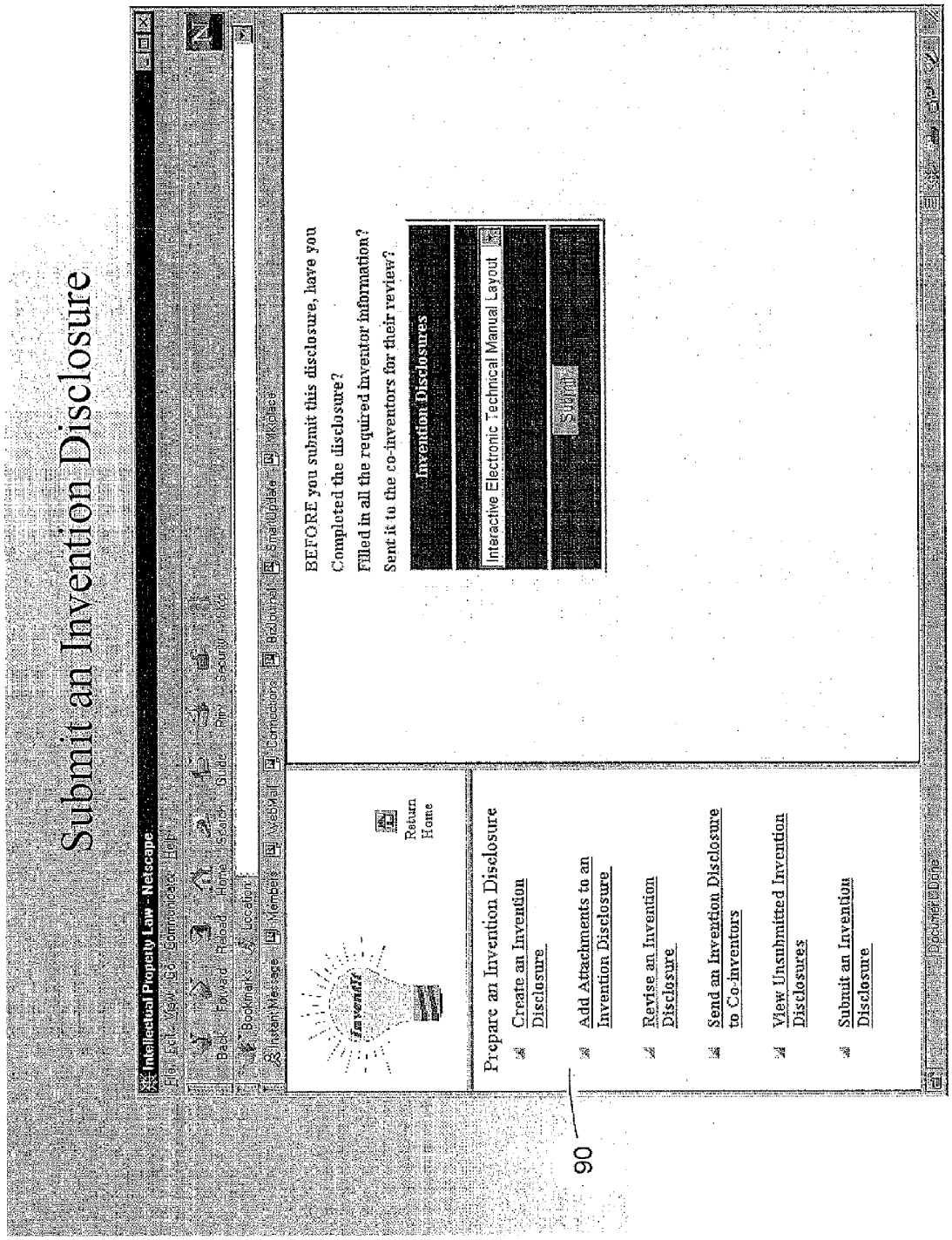
Figure 22:
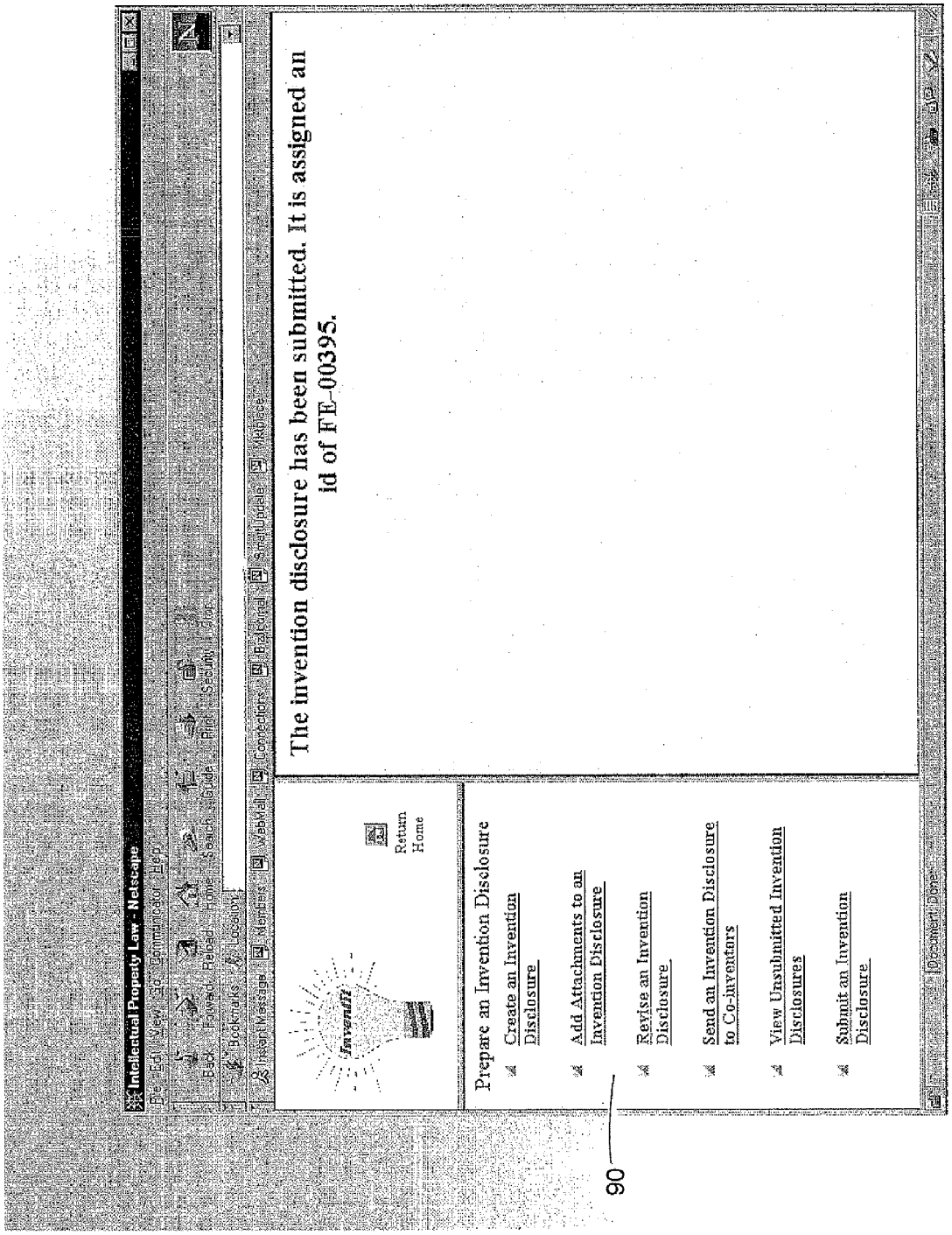

To submit the invention disclosure, the primary inventor selects the appropriate option as shown in display portion 90 in FIG. 11 to obtain a display for submitting the disclosure, as shown in FIG. 21. Once the invention disclosure has been submitted, an invention disclosure number is assigned, as shown in FIG. 22.

Figure 23:
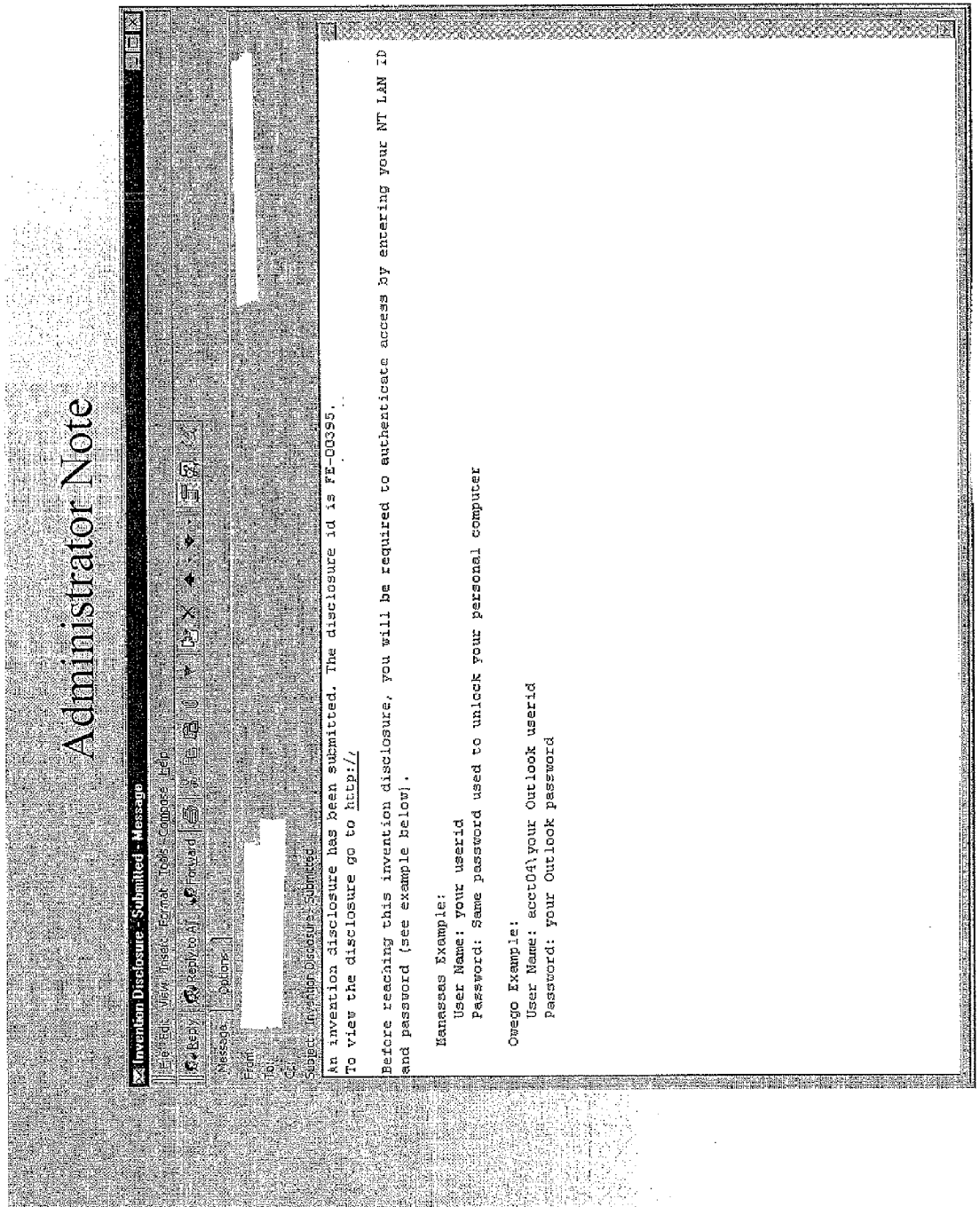
Figure 24:
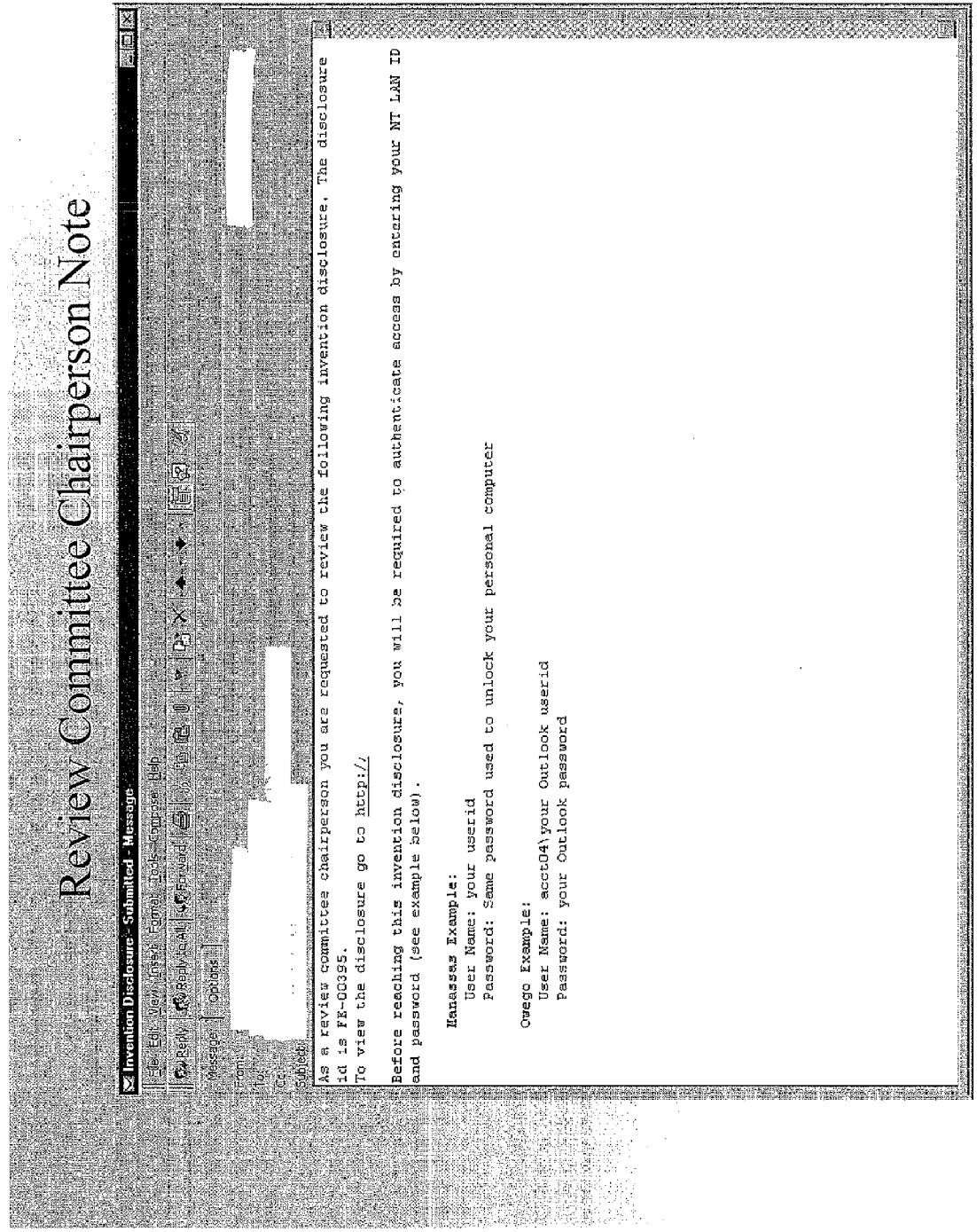
Figure 25:
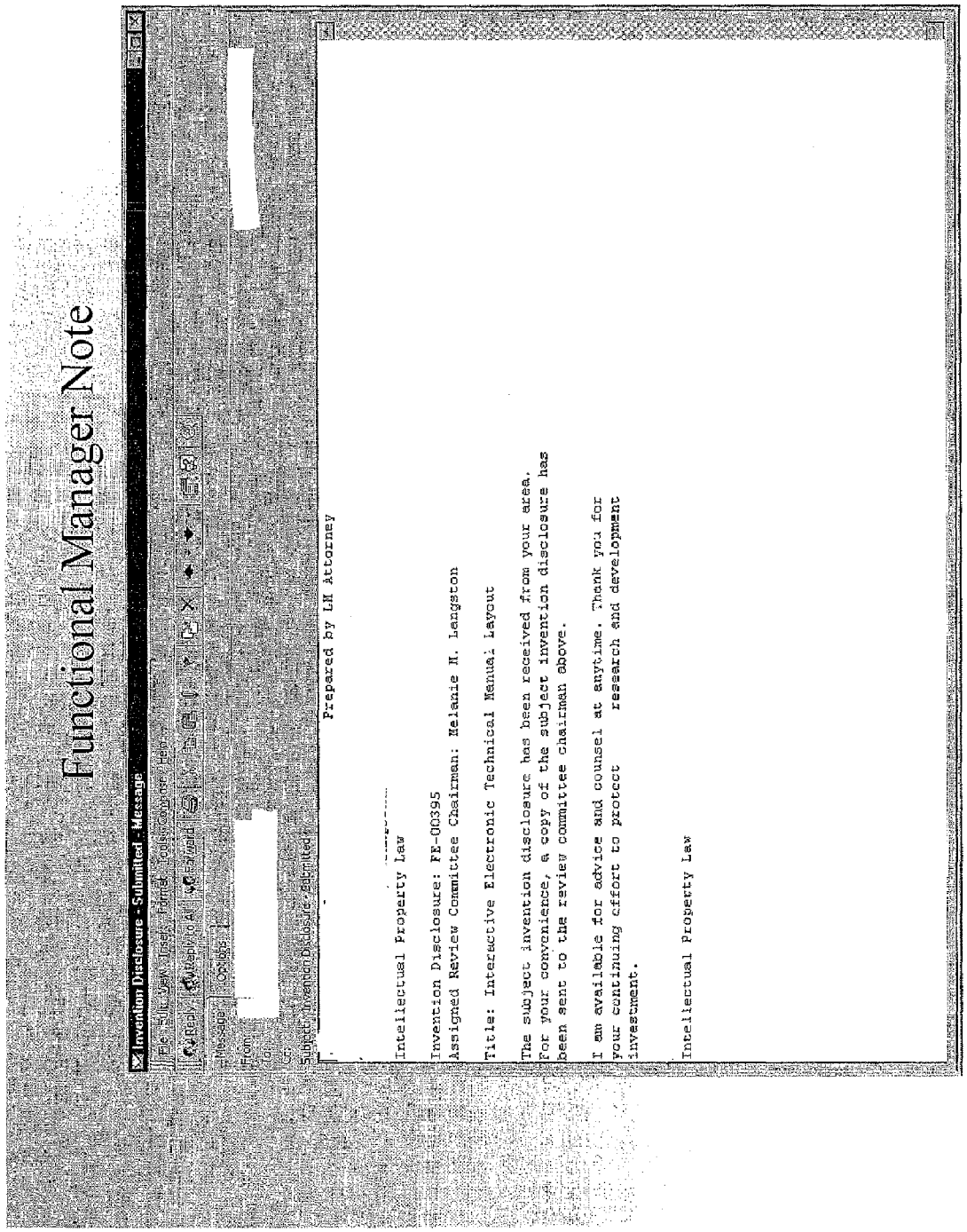
Figure 26:
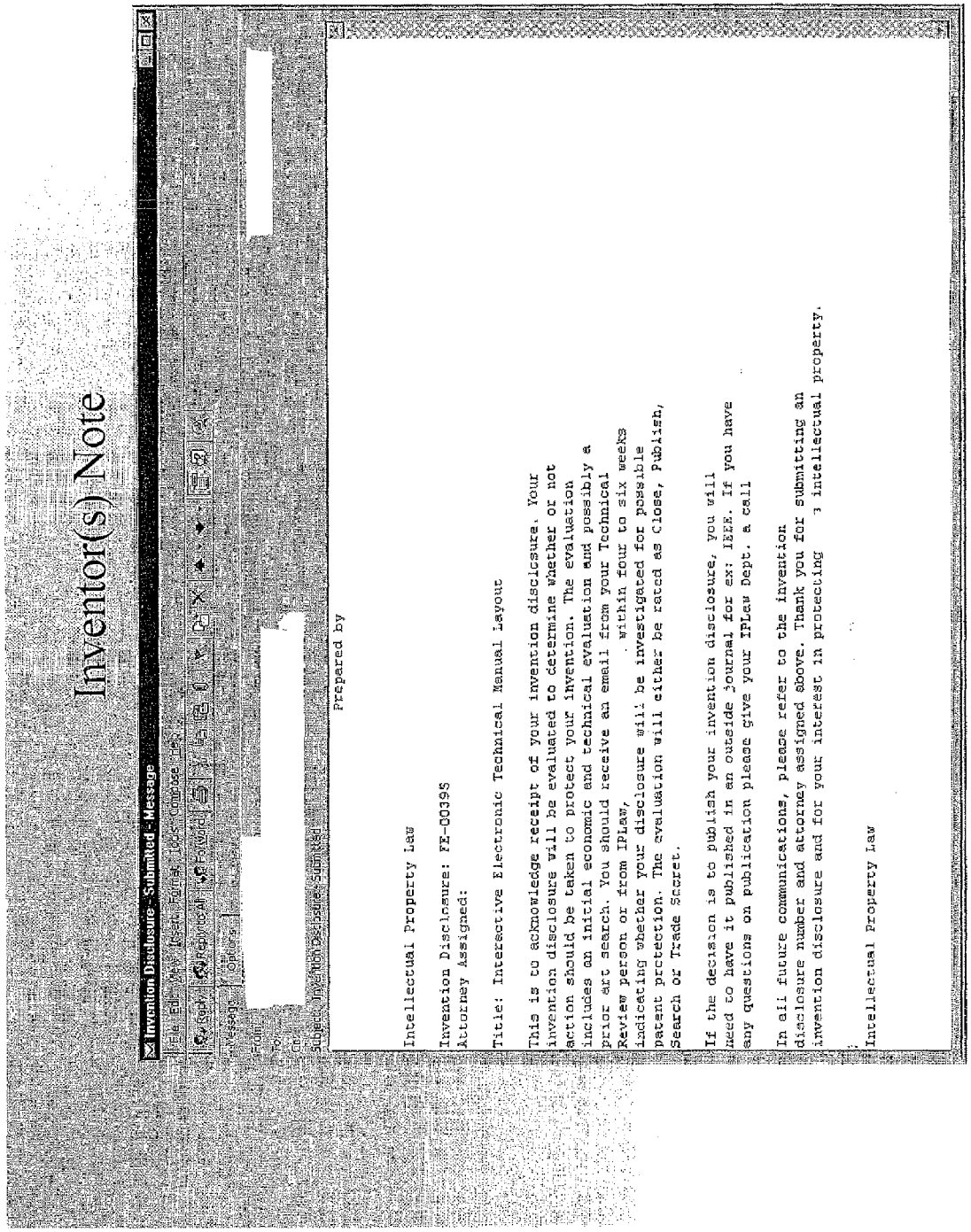
Figure 27:
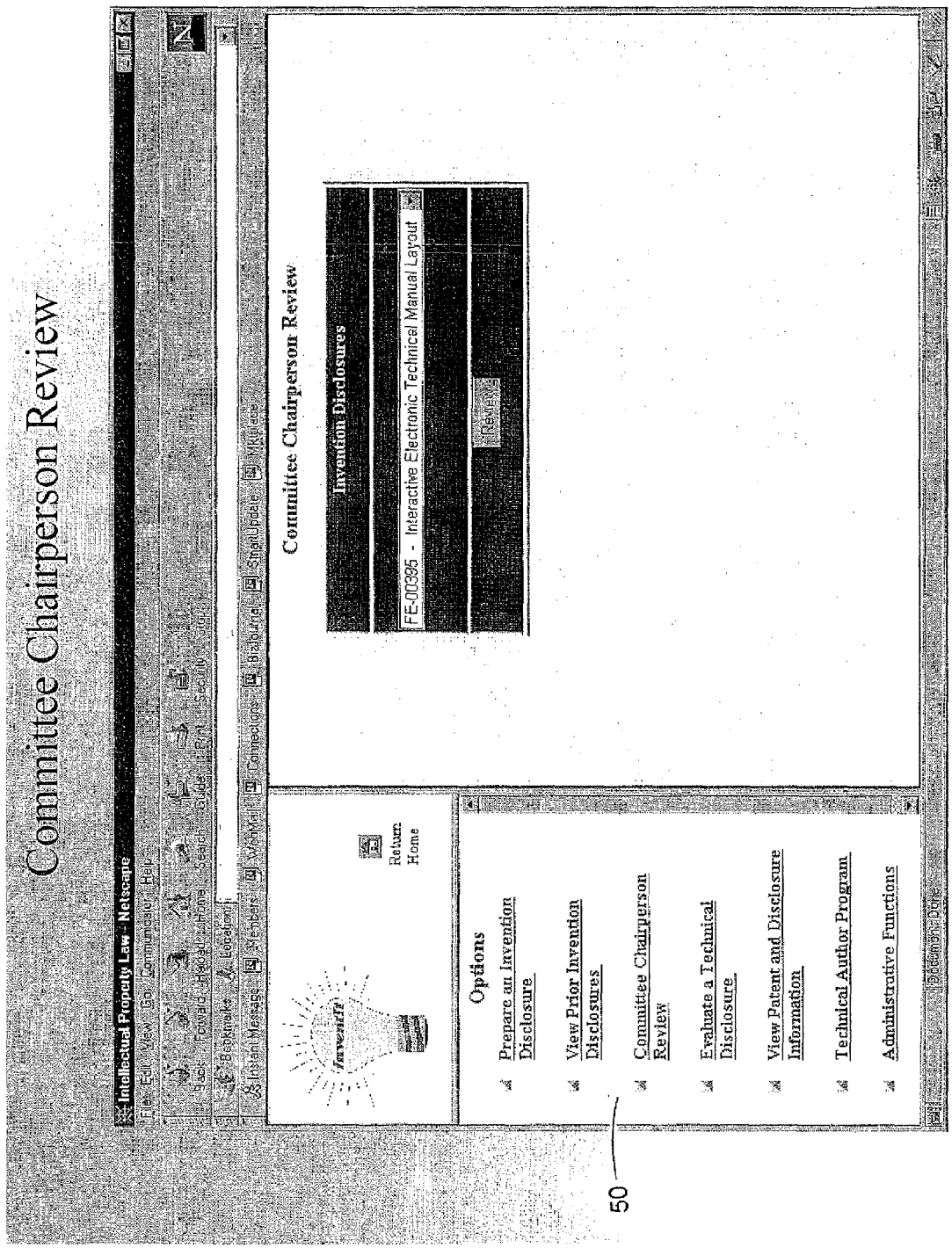
Figure 28:
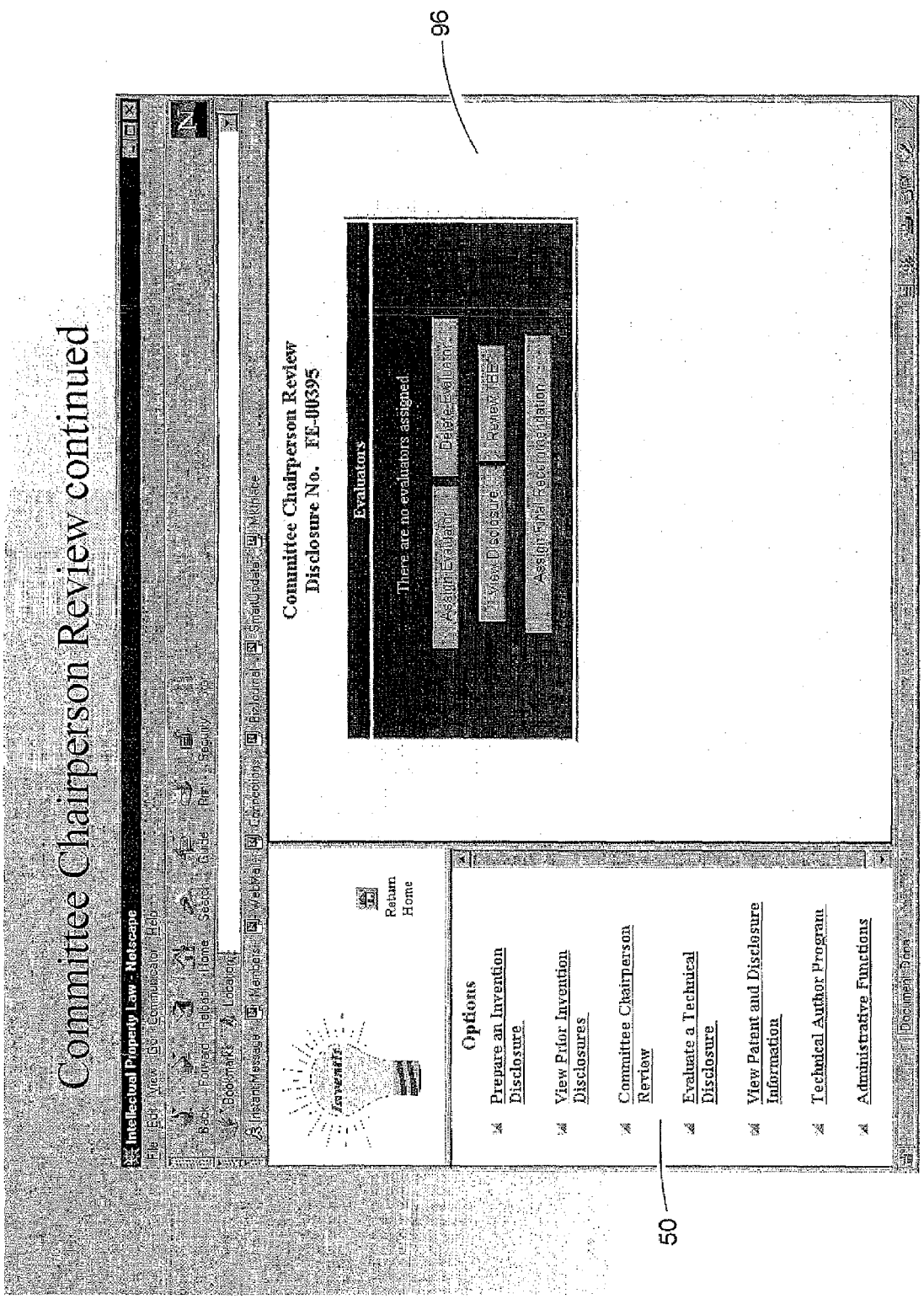

Sample e-mail notification messages are provided with reference to FIGS. 23-25. For example, sample e-mail messages with the hyperlink sent to the IP administrator and the review committee coordinator are respectively shown in FIGS. 23-24. Similarly, sample e-mail messages without the hyperlink are sent to the functional area manager and the inventor as respectively shown in FIGS. 25-26.

Figure 29:
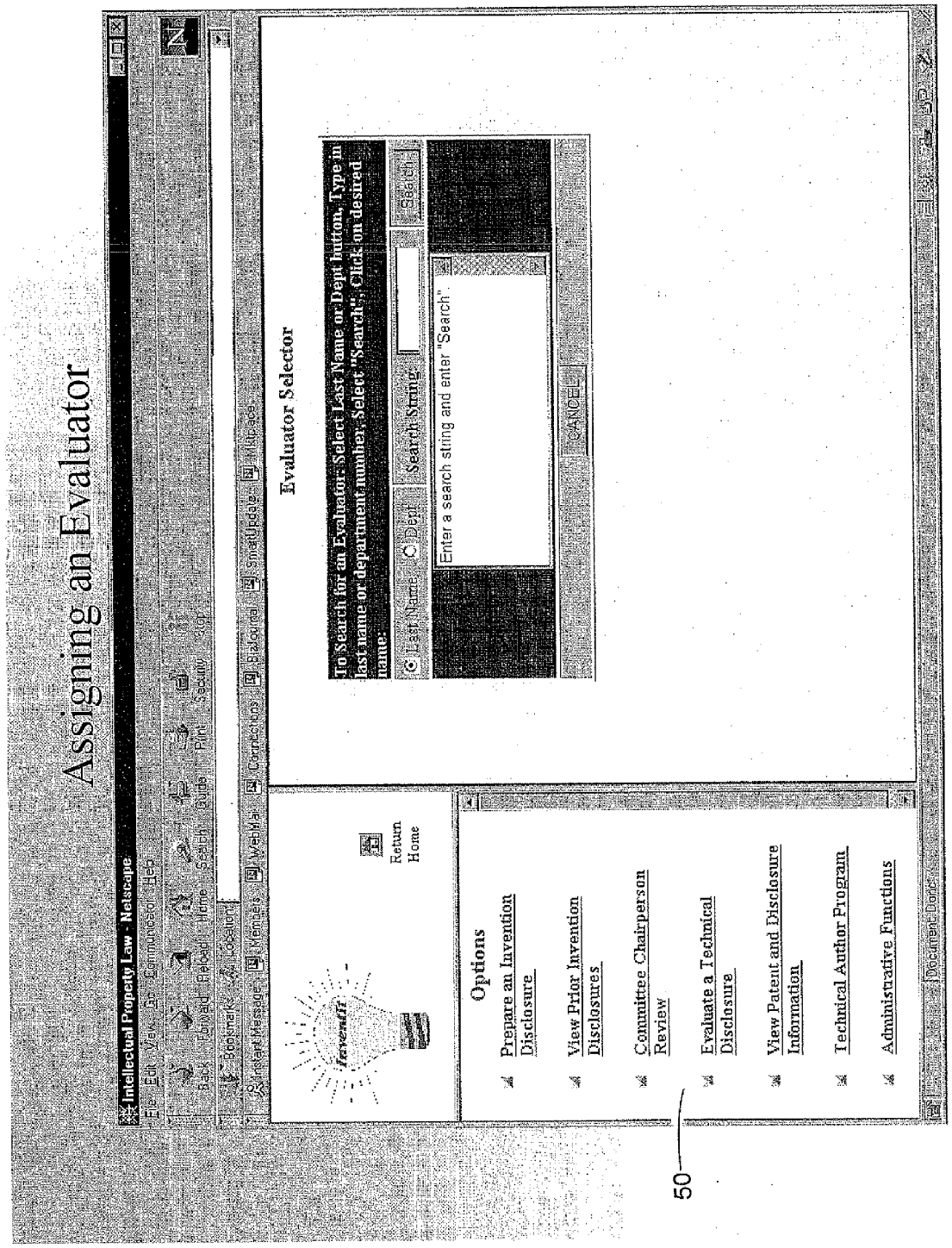
Figure 30:
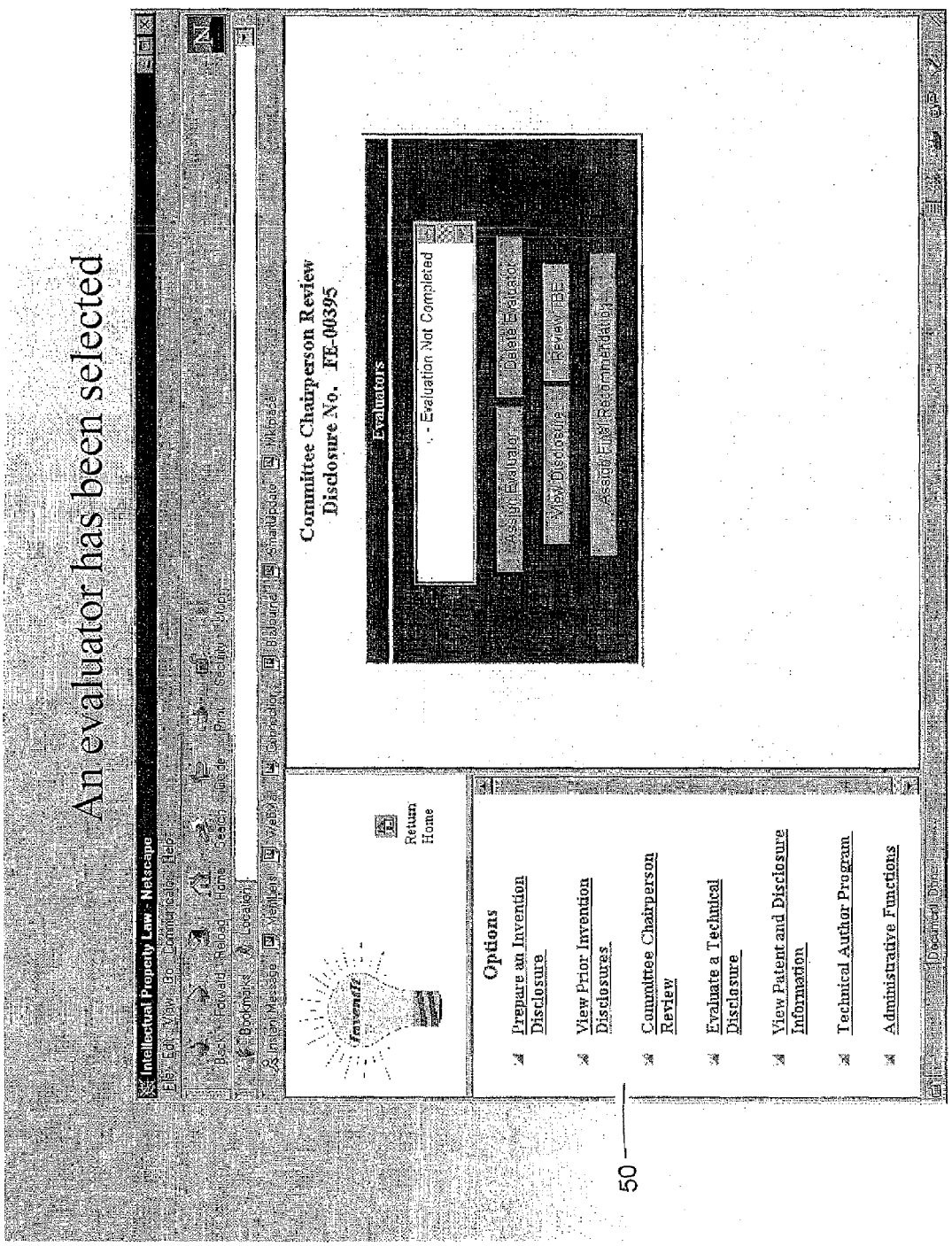
Figure 31:
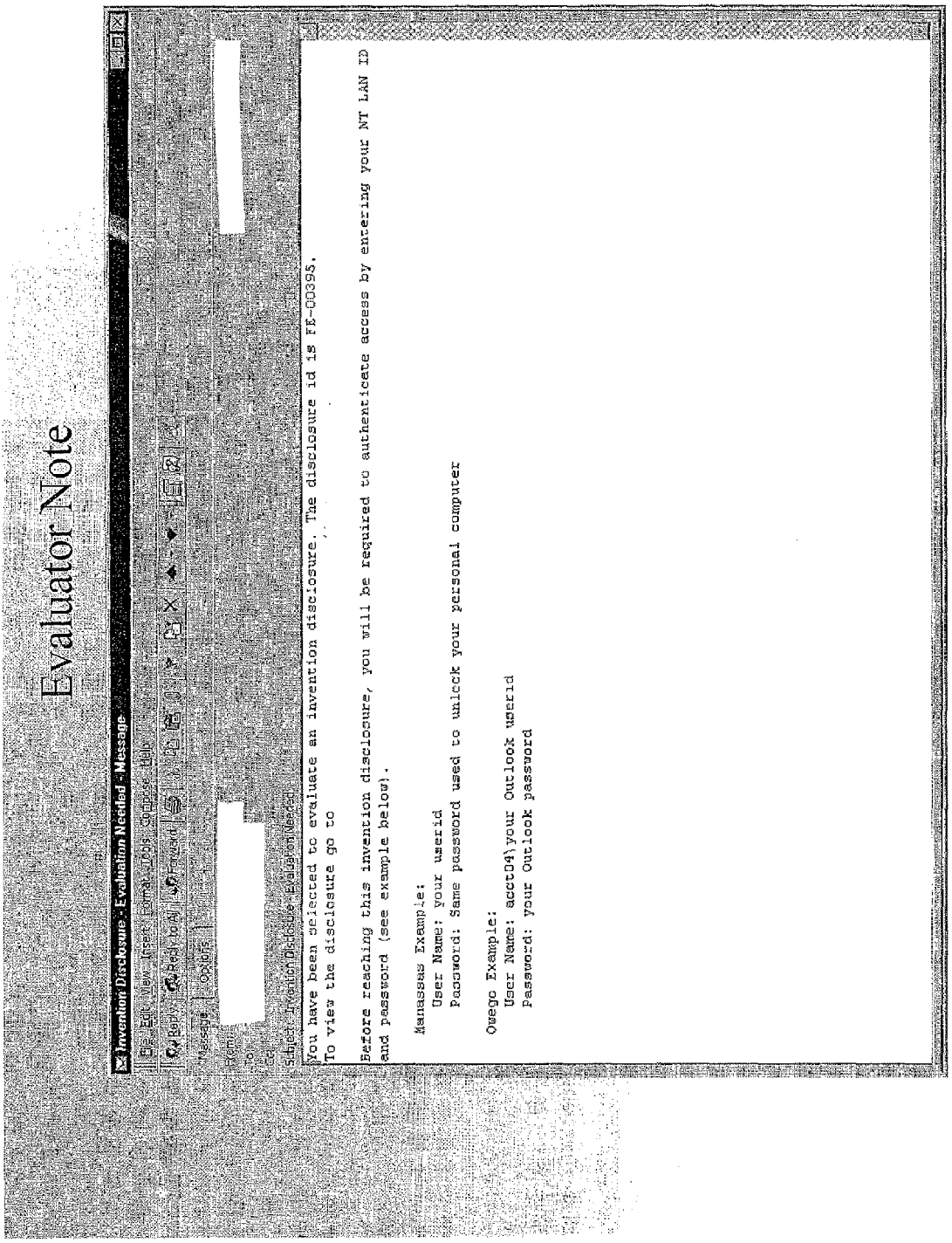

Referring now to FIGS. 27-31, displays are provided illustrating review of the invention disclosure, and selecting an evaluator for the invention disclosure. As shown in field 96 in FIG. 28, the committee review coordinator has the option to assign an evaluator, delete an evaluator, view the invention disclosure, review the technical/business evaluation of the invention disclosure (if already performed), and assign a final recommendation (after receiving evaluation comments). The committee review coordinator assigns an evaluator, as shown in FIGS. 29-30. Once an evaluator has been selected, an e-mail notification message having a hyperlink to the invention disclosure is provided to the evaluator, as shown in FIG. 31.

Figure 32:
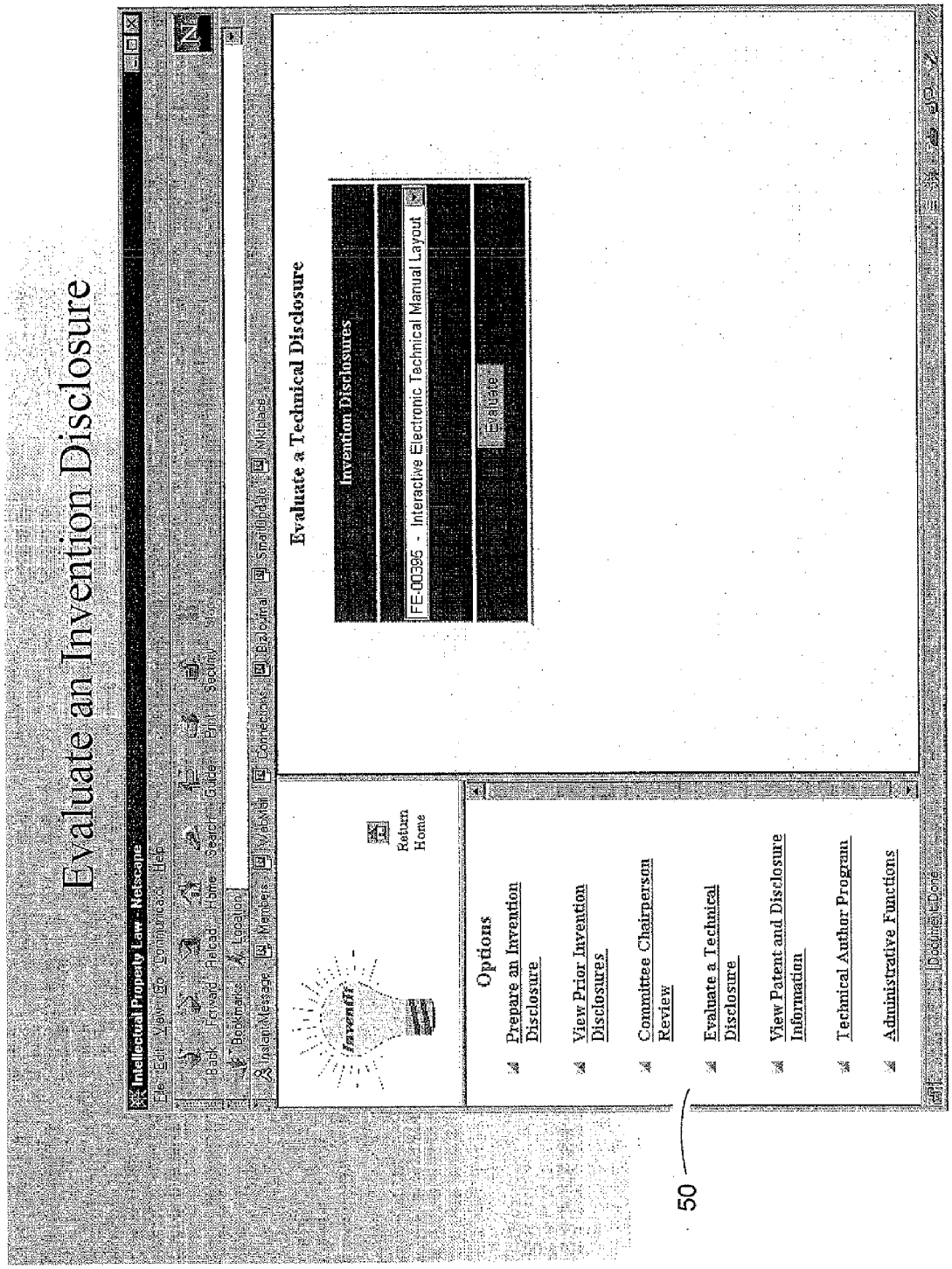
Figure 33:
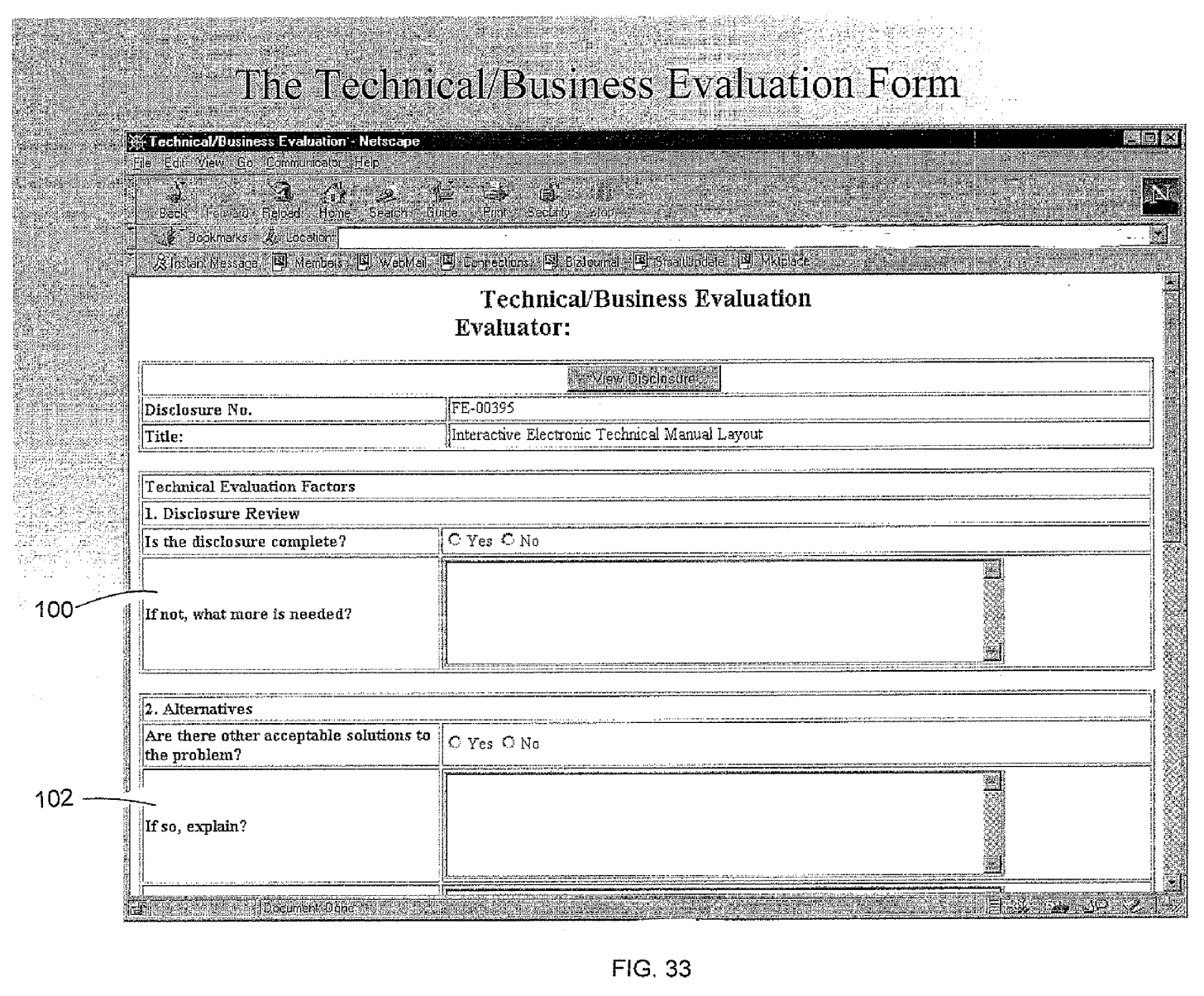
Figure 34:
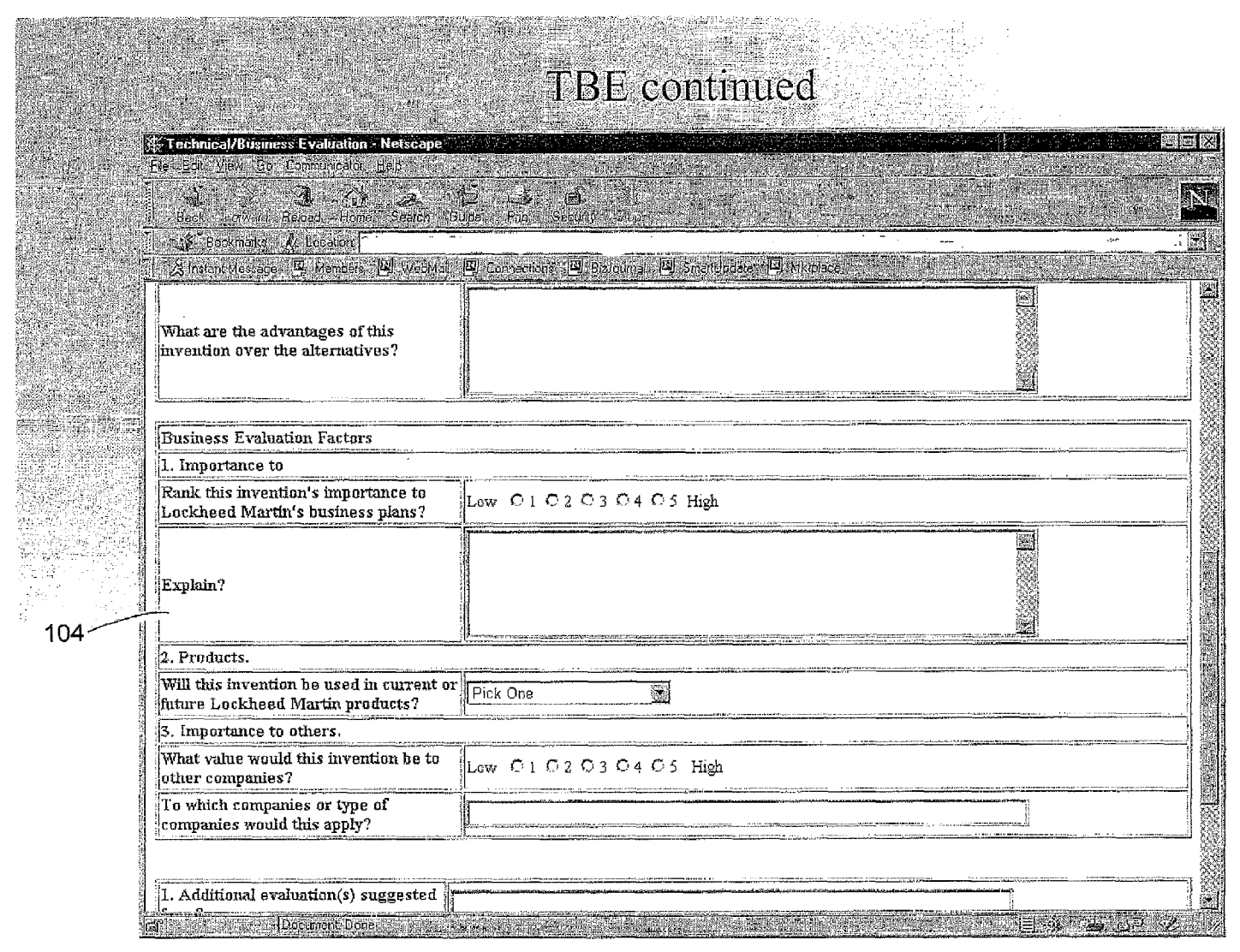
Figure 35:
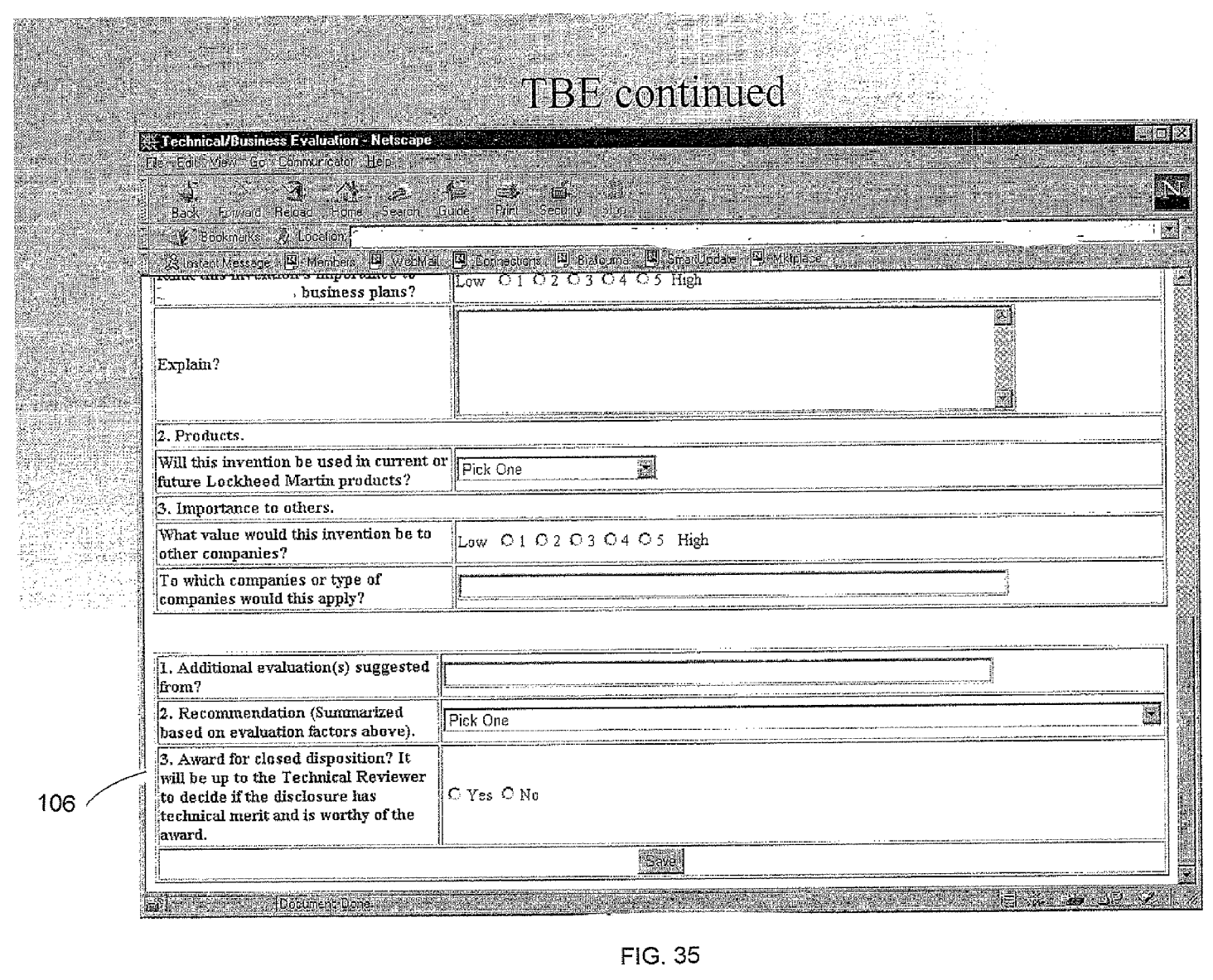
Figure 36:
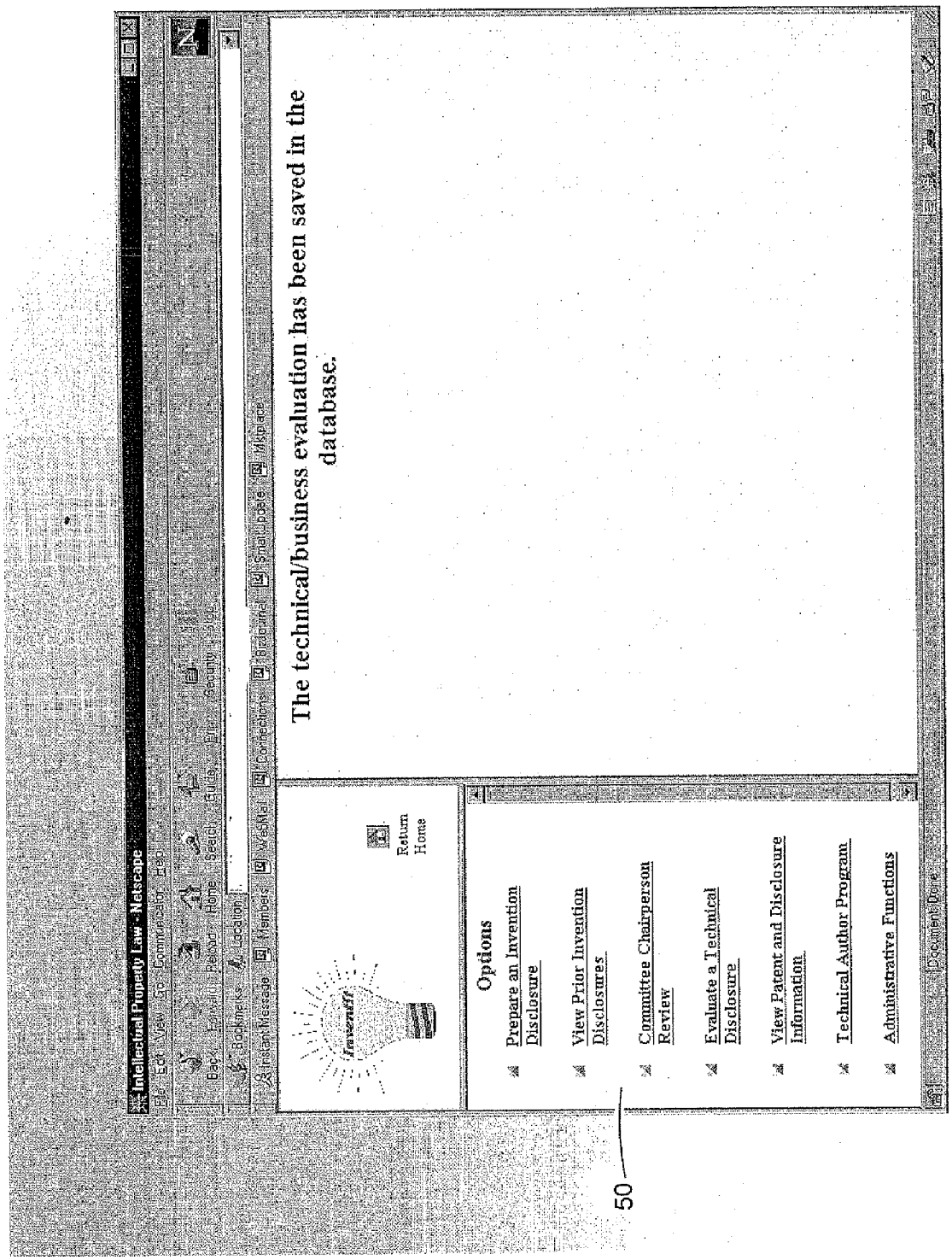

Selecting from the options field 50 as shown in FIG. 32, the evaluator selects the text "evaluated a technical disclosure form." This causes the technical/business evaluation displays to be viewed, as shown in FIGS. 33-35. Information to be provided by the evaluator includes technical evaluation factors as shown in field 100, and alternatives as shown in field 102. Several business evaluation factors fields are also provided as shown in field 104, followed by a general comments field 106. Once the evaluation form has been filled out, the evaluator saves the form, which then provides a saved status to the evaluator, as shown in FIG. 36.

Figure 37:
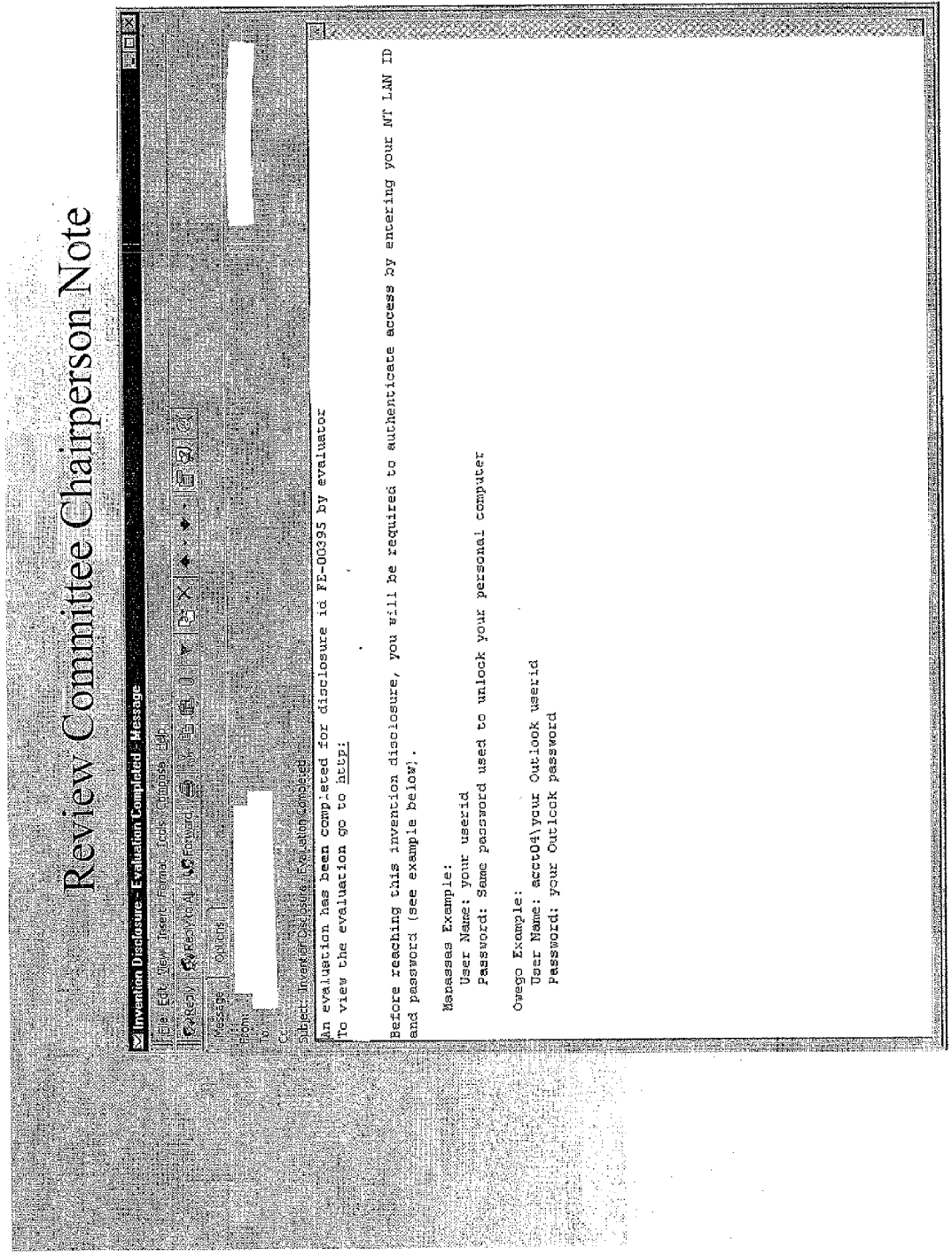
Figure 38:
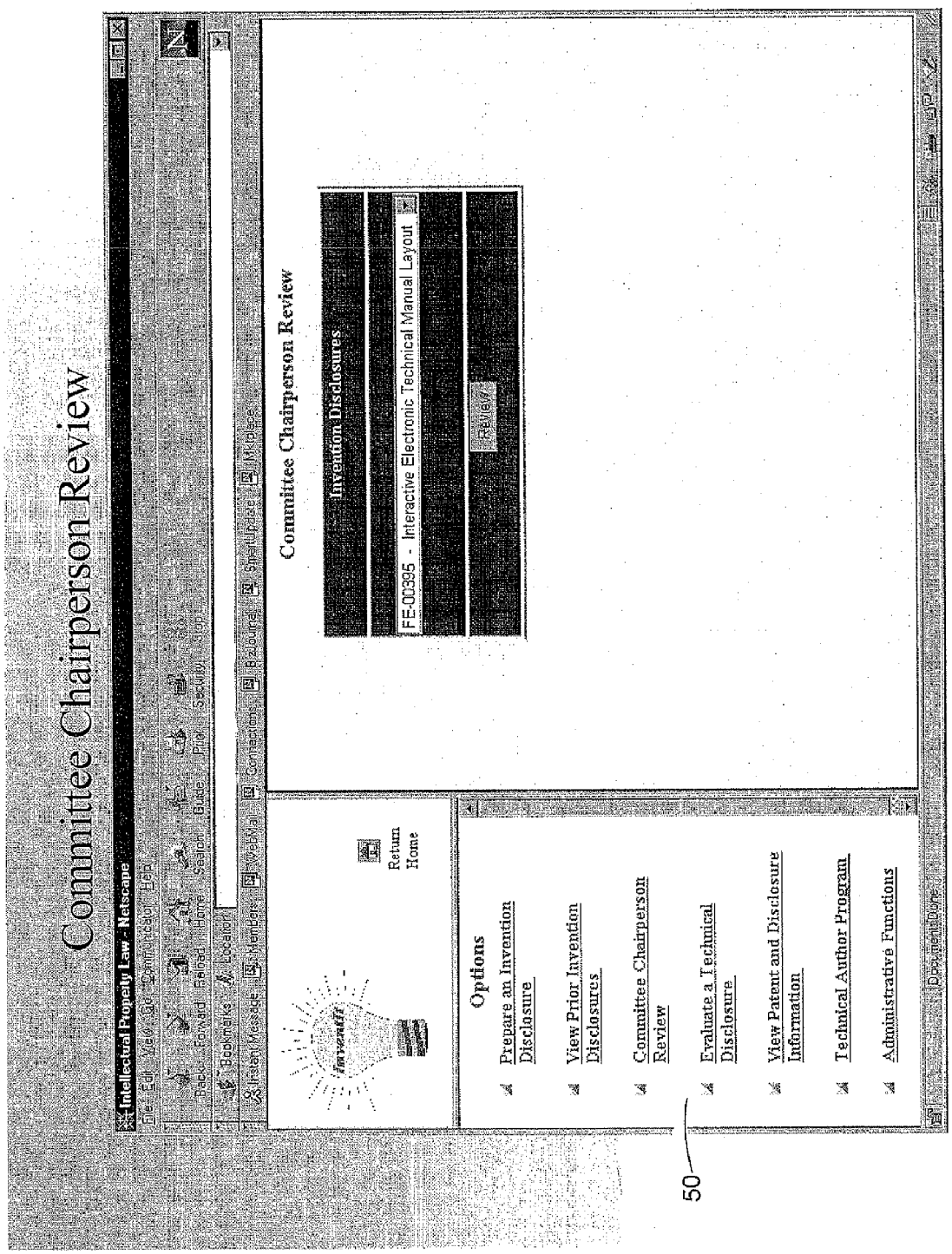
Figure 39:
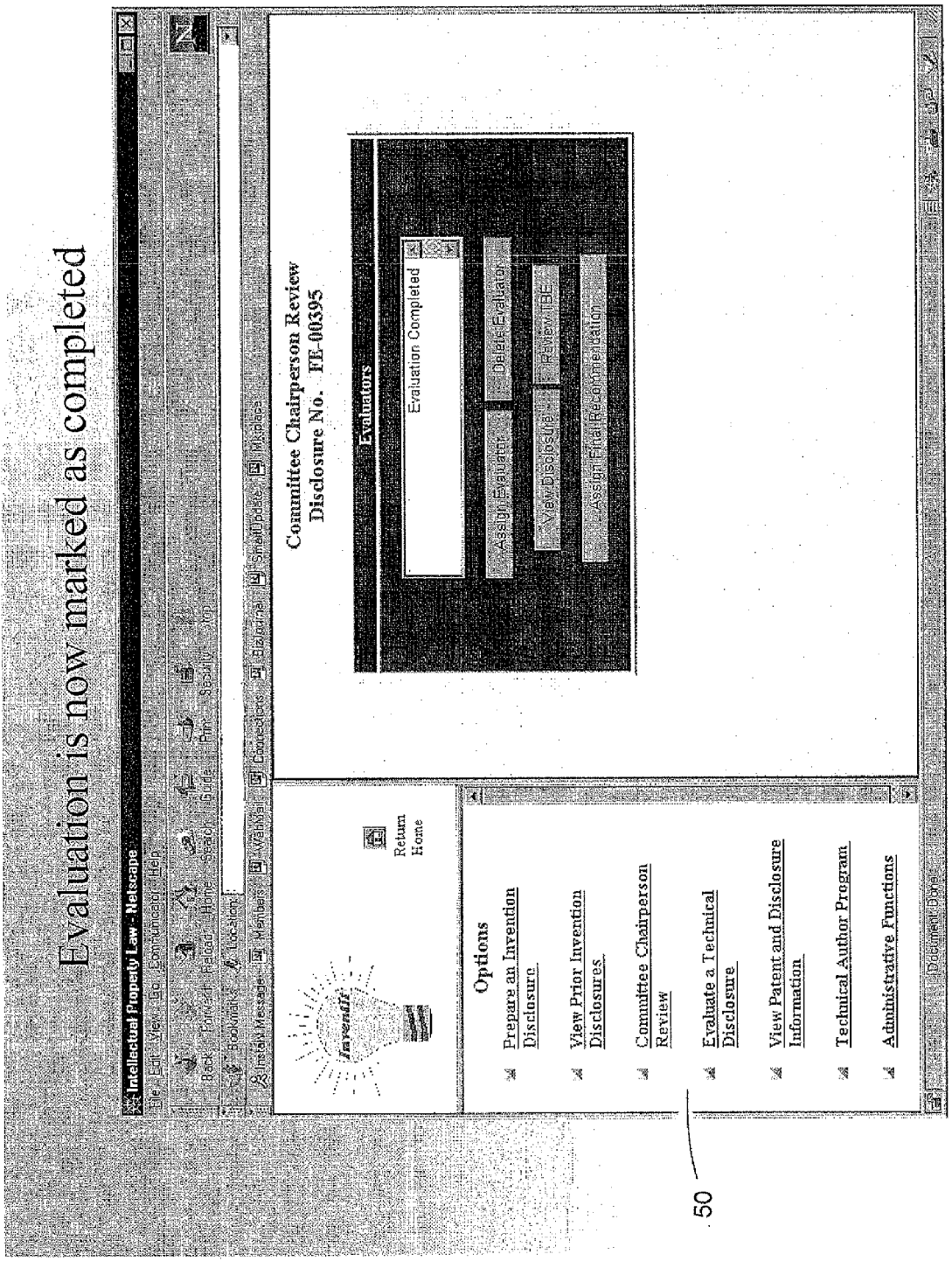
Figure 40:
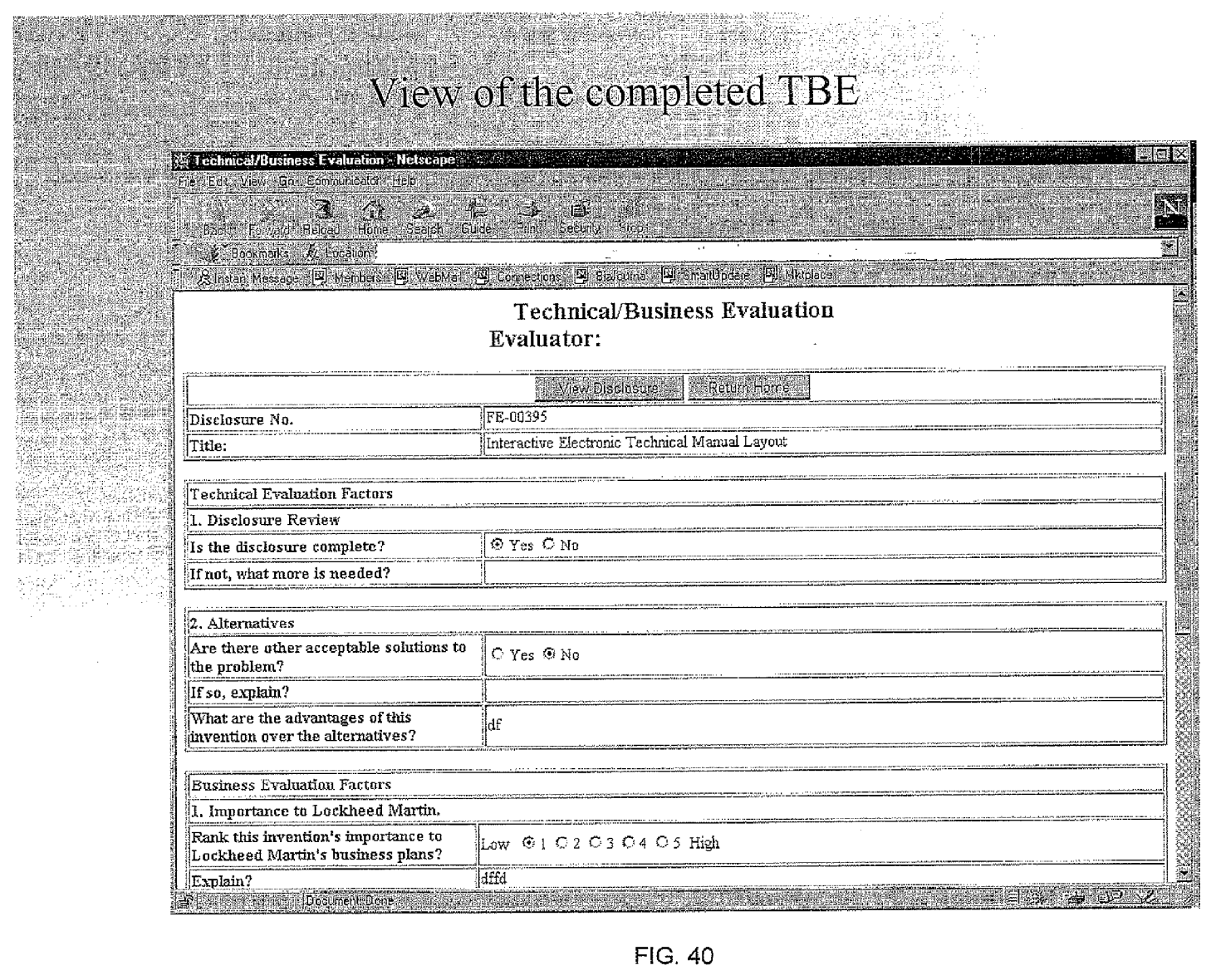
Figure 41:
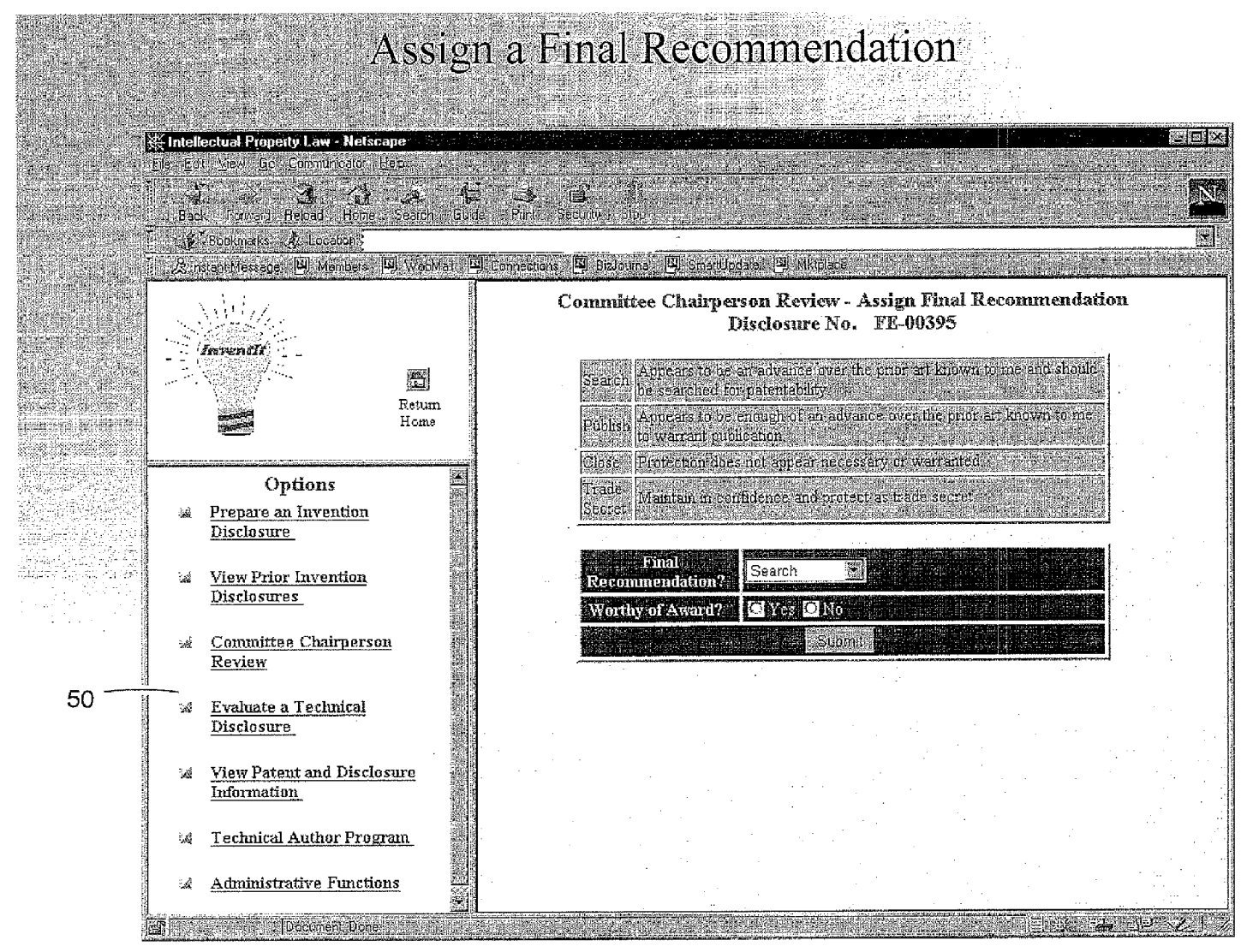
Figure 42:
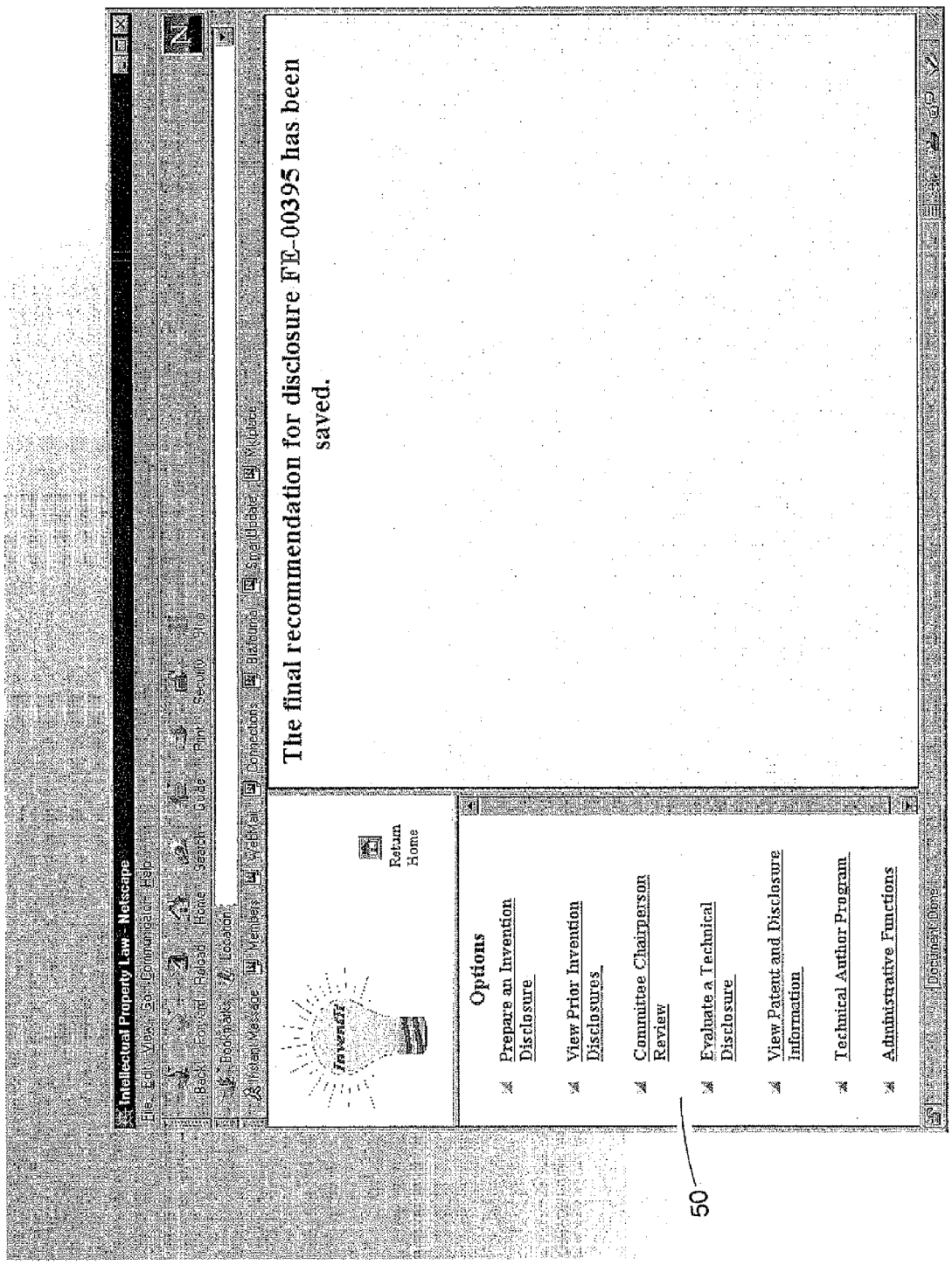

In response to the evaluation form being saved, an e-mail notification message is sent to the review committee coordinator, as shown in FIG. 37. Review of the actual evaluation form is viewable by selecting the hyperlink provided in the e-mail notification message. The committee review coordinator selects the committee coordinator review option in field 50, as shown in FIG. 38. The committee review coordinator reviews the same display previously provided for selecting the evaluator. Herein, the committee review coordinator can select review of the completed technical/business evaluation form, as partially shown in FIG. 40. The committee review coordinator then assigns a final recommendation selecting from search, publish, close, or protect as a trade secret, as shown in FIGS. 41-42.

Figure 43:
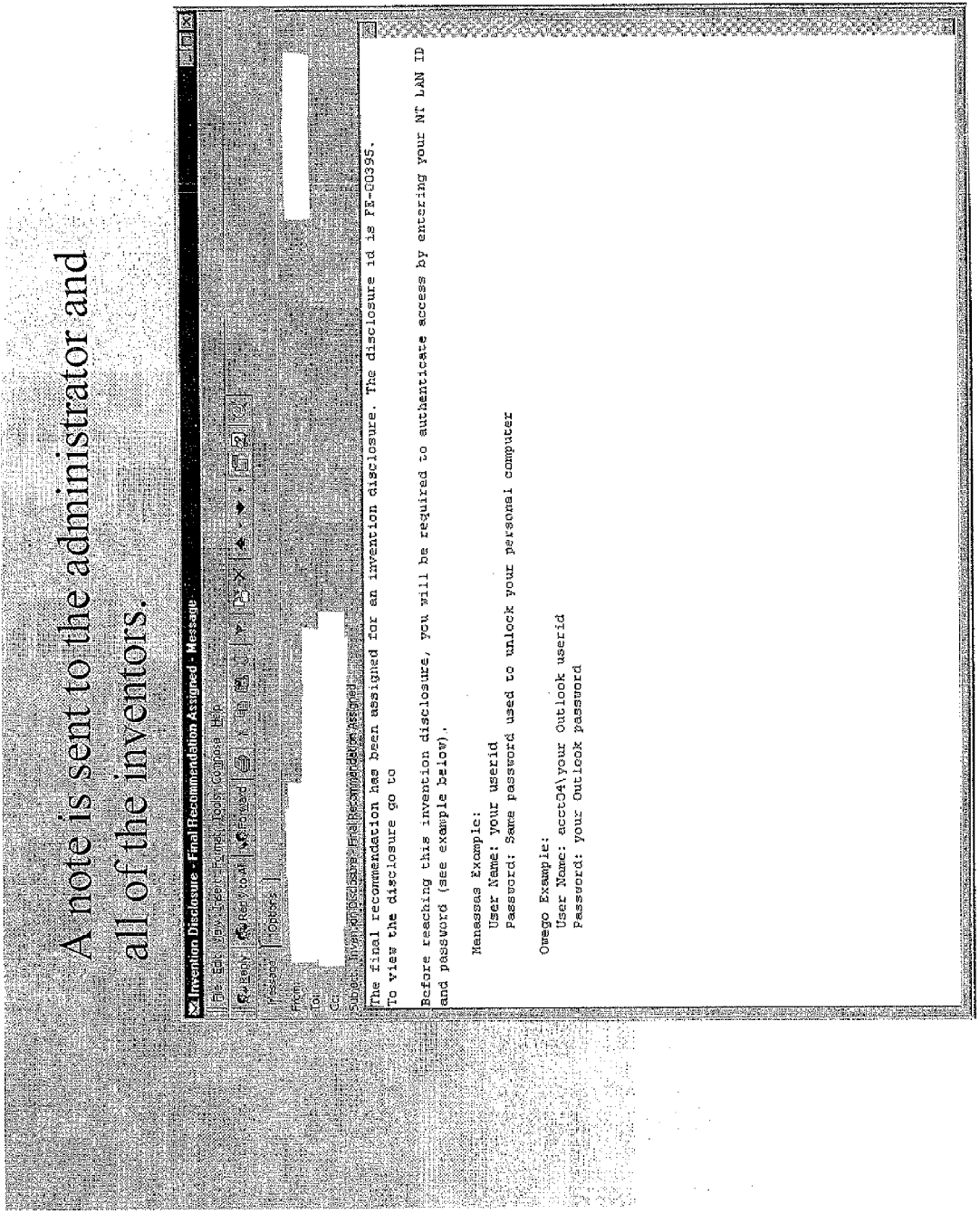

After the committee review coordinator selects the recommendation, an e-mail notification message is sent to the IP administrator and other applicable personnel, as shown in FIG. 43. These other personnel include the first and second groups of users as described above. The first and second groups of users are determined based upon the created profile of the invention disclosure. In one embodiment, the users include the applicable business area manager, the supervisor of the primary inventor, the primary inventor and co-inventors, the technical review coordinator, and a contract administrator if the invention was developed under a government contract.

Figure 44:
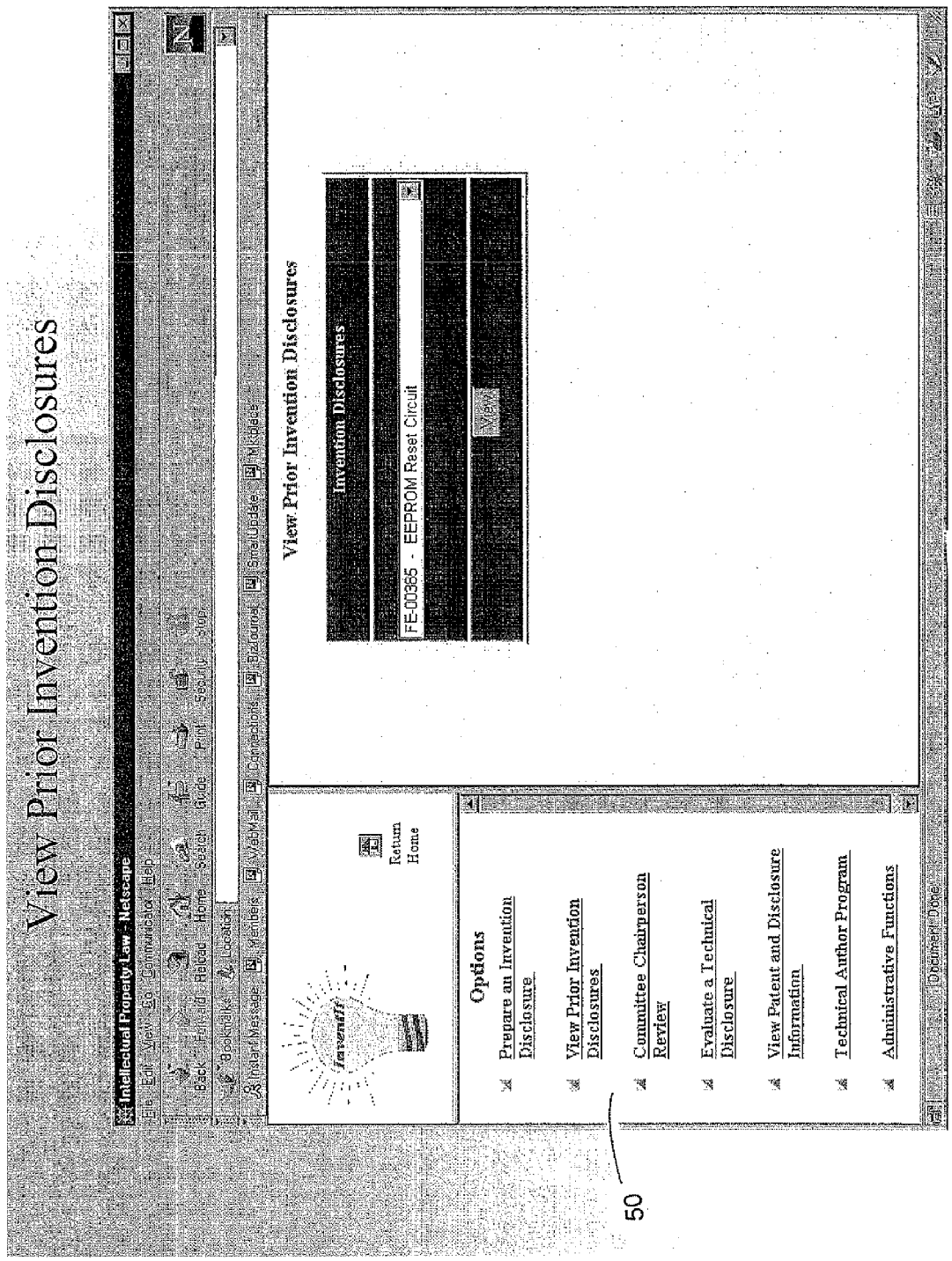
Figure 45:
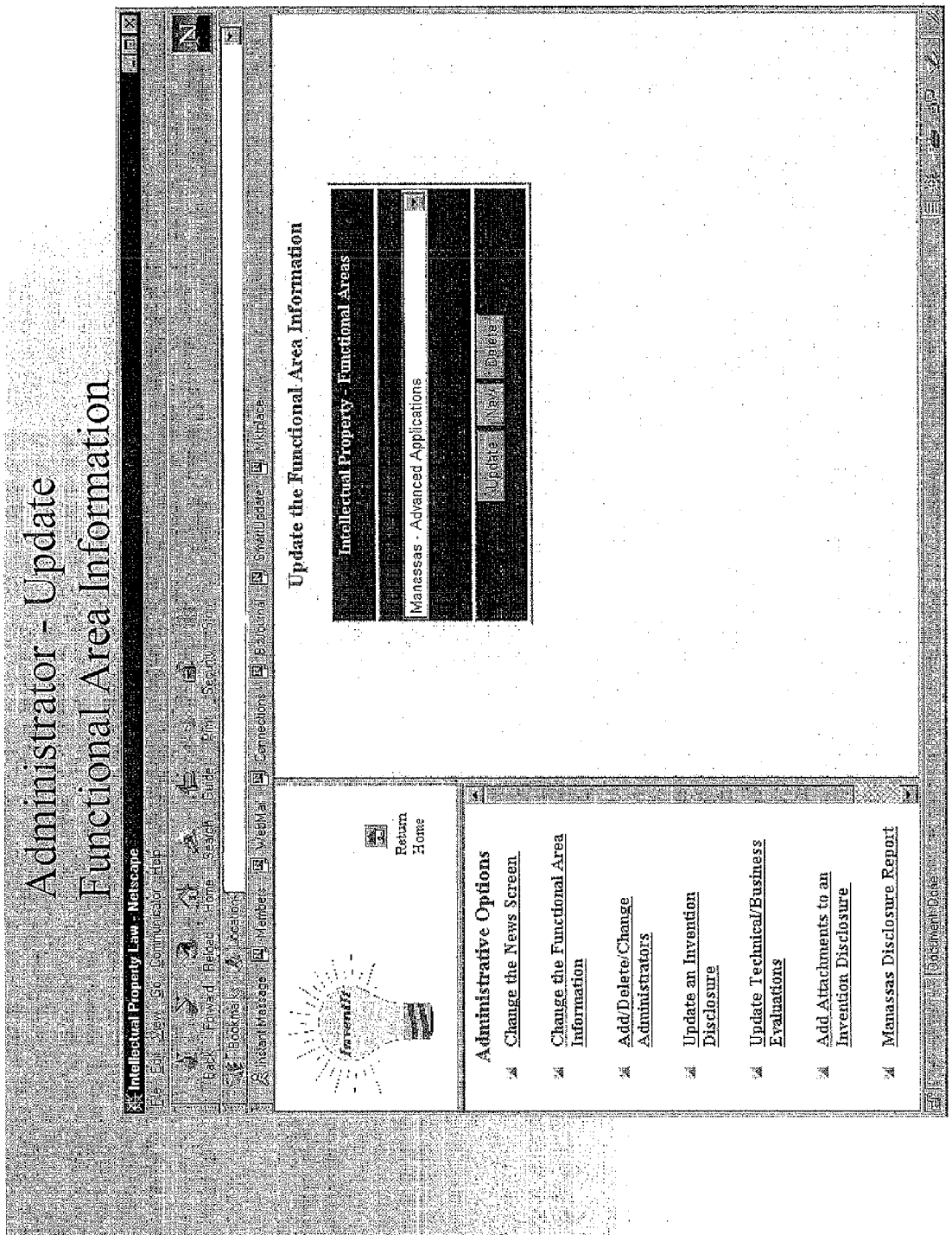

Other functions available within the invention disclosure process include viewing prior invention disclosures, as shown in FIG. 44, and updating functional area information, as shown in FIG. 45. In addition to distributing an invention disclosure over the intranet as just described, a technical paper approval process will be now be described with reference to FIGS. 46-48. The technical paper approval process is similar to the invention disclosure process and can be accessed from the invention disclosure process, as shown in field 50 in FIG. 3.

The technical paper approval process is similar to the invention disclosure process because e-mail notification messages with hyperlinks to the technical paper are used to complete the approval process. Because the intranet is a limited access system requiring each user to be enrolled in the intranet, electronic signatures are acceptable for this approval process.

The technical paper approval process is used to approve the external and internal release of technical papers, abstracts, presentations, reports, journals articles, books, and other information intended for publication or presentation outside of a particular corporation. In addition, technical papers related to projects that were funded under government contracts require government approval before initial publication. In other words, release approval is required each time information is to be presented by an author, particularly within a large company.

The technical paper approval process helps to speed up the time normally required to obtain approval, particularly when a half a dozen or more people have to review and provide comments as to whether the technical paper can be released. The author of the technical paper first accesses the home page of the technical paper approval program. In one embodiment, the author enters information such as the title of the paper, classification, and type of paper, as best shown in FIG. 46. The author also enters his name, employee number, internal address, telephone number, and e-mail address. If there is a second author, the same fields are also to be filled in for the second author.

If the paper is to be presented at a conference, specific information is to be provided by the author, as indicated in FIG. 47. The author is also required to identify a technical peer reviewer. If the technical paper relates to a government contract, an invention disclosure, a patent or any unique concepts, then specific fields are to be filled in by the author, as indicated in FIG. 48. Once the fields in FIGS. 46-48 have been filled in, e-mail notification messages having hyperlinks to the technical paper are provided to the appropriate personnel required to review the technical paper. The technical paper is included as an attachment to the technical paper form filled out by the author.

In one embodiment, company personnel required to review the technical paper includes the author's manager and project manager, a technical reviewer, and a reviewer from the intellectual property department. Other reviewers include a security person to review if the information is classified, a communications person to see if format and grammar is correct, and an export/import person who typically sends the paper to a government agency for approval if it actually contains sensitive technical data.

An advantage of the technical paper review process is that the author does not have to walk around with a paper copy of the technical paper and confront each person required to review the paper before it can be presented or published. The intranet approval process significantly speeds up the approval process. Furthermore, the author has the ability to status whether a reviewer has signed off or not. Another advantage of the technical paper process is a delegate feature, wherein a backup or alternate reviewer can be selected if the initially selected reviewer is not able to review the paper in time.

In addition to distributing either an invention disclosure and a technical paper over the intranet as just described, a confidentiality agreement or a proprietary information exchange agreement (PIEA) approval process for contracts can also be implemented over the intranet. This process is applicable to any confidential information that is to be exchanged between corporations. This process establishes an agreement between the corporations stating the terms and conditions of the exchange.

The confidentiality agreement approval process is similar to the two processes described above. The confidentiality agreement approval process uses e-mail notification messages with hyperlinks to the proposed confidentiality agreement to be reviewed. Because the intranet is a limited access system requiring each user to be enrolled in the intranet, electronic signatures are also acceptable for this approval process.

The confidentiality agreement approval process is thus used to approve the release or exchange of confidential or proprietary information with another corporation. However, before any such information can be released or exchanged, an agreement or contract defining the terms and conditions must first be signed between the parties. The confidentiality agreement approval process advantageously speeds up this process buy sending e-mail notification messages to the appropriate personnel to review the information to be released. The e-mail message includes a hyperlink to the confidentiality approval form containing the terms and conditions of the information to be released. The actual contract is included as part of this process.

The user desiring to release the confidential information or to receive confidential information from another corporation accesses the home page of the confidentiality agreement approval process and enters information with respect to the parties involved, along with a brief description of the information. This brief description also describes the initial terms and condition pertaining to the release or exchange of the information.

As part of the process, there are two options to obtain a confidentiality agreement approved by key personnel within the corporation. One option is to select a default approval list based upon a profile of the person submitting the request. The second option is to tailor a selected approval list. Depending on the level of the user, different management, contract and legal personnel can be selected or replaced with respect to the default list.

Once the approval list is selected, an e-mail notification message is transmitted to the appropriate personnel to review the proposed agreement. Other options are also available for the reviewer, such as a manager requesting that certain members of his staff review the agreement before he signs off approving the agreement. All the comments and approvals are received by a business personnel responsible for incorporating all the comments into the final agreement. Afterwards, the two corporations can sign the agreement.

An advantage of the confidentiality agreement approval prevents the user desiring to release the information from having to walk around with a paper copy of the exchange agreement and confront each person required to review the agreement before it can be submitted to the other corporation. The intranet approval process significantly speeds up the approval process. Furthermore, the user has the ability to status whether a reviewer has signed off or not.

The intranet system used to implement the invention disclosure process can also interface with a docketing database system, such as the program sold by Computer Packaging in Rockville, Md. More particularly, the profile information entered into the database server by the inventor when the invention disclosure is created is also provided to the docketing database. The information pertaining to the profile (e.g., critical date information, contract information, reduction to practice information, etc.) of each invention disclosure is provided to the docketing database. The docketing database can then be used to set schedules and/or various events in the invention disclosure process.

The technical paper approval process and the confidentiality agreement approval process can also interface with the docketing database. For example, the publication date of a technical paper may set a bar date for the filing of a patent application. Consequently, this information will be entered into the docketing database. Likewise, a potential on-sale bar date may be generated as an agreement generated by the confidentiality agreement process.

As discussed above, the invention disclosure process may also be implemented over the internet using an encrypted or secured connection. For instance, remote sites are able to upload information to the intranet database server 10 and the docketing database. The transmittal of classified papers may also be exchanged over this secured connection.

Many other modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

The invention claimed is:

1. A method for distributing an invention disclosure over an intranet, the method comprising:
    accessing an invention disclosure template form over the intranet, with the invention disclosure template form providing the following options
        create an invention disclosure,
        add attachments to an invention disclosure, revise an invention disclosure,
send an invention disclosure to a co-inventor,
view an unsubmitted invention disclosure, and
submit an invention disclosure;
creating an invention disclosure by selecting the corresponding option in the accessed invention disclosure template form, with the invention disclosure providing information about an invention;
adding an attachment to the invention disclosure by selecting the corresponding option in the accessed invention disclosure template form, with the attachment providing additional information about the invention and with the attachment being added without the use of a hyperlink;
submitting the invention disclosure by selecting the corresponding option in the accessed invention disclosure template form, with the invention disclosure being submitted along with the attachment over the intranet to at least one evaluator via e-mail with a hyperlink to the invention disclosure; and
transmitting evaluation comments on the invention disclosure and the attachment by the at least one evaluator via e-mail.

2. A method according to claim 1, wherein the intranet includes a plurality of users enrolled therein with each user having associated personnel information stored within the intranet, the method further comprising:
creating a profile of the invention disclosure based upon a technical area relating to the invention disclosure in response to accessing associated personnel information of the inventor; and
transmitting a first notification message via e-mall to a first group of users based upon the created profile, the first group of users being within the plurality of users and including a technical review coordinator, the first notification message having a hyperlink to the invention disclosure.

3. A method according to claim 2, wherein the at least one evaluator is selected by the technical review coordinator.

4. A method according to claim 3, further comprising:
submitting a recommendation of the invention disclosure by the technical review coordinator based upon the evaluation comments; and
transmitting the recommendation of the invention disclosure via e-mail to the first group of users.

5. A method according to claim 2, wherein transmitting the first notification message is responsive to submission of the invention disclosure.

6. A method according to claim 2, wherein the profile comprises a functional manager of the inventor, a patent attorney, a technical review person, and a contracts person if the invention was developed under government funds.

7. A method according to claim 6, wherein the profile further comprises information relating to the inventor including the inventor's employee number, department number, building number, phone number and e-mail address.

8. A method according to claim 2, wherein the first group of users comprises a technical review coordinator, a contract administrator if the invention was developed under government funds, and an intellectual property administrator.

9. A method according to claim 8, wherein the first group of users further comprises a business area manager, a supervisor of the inventor, and the inventor.

10. A method according to claim 1, further comprising sending a notification message to a co-inventor, the notification message being transmitted via e-mail with a hyperlink to the invention disclosure.

11. A method for distributing an invention disclosure over an intranet, the intranet having a plurality of users enrolled therein with each user having associated personnel information stored within the intranet, the method comprising:
accessing an invention disclosure template form over the intranet, with the invention disclosure template form providing the following options
create an invention disclosure,
add attachments to an invention disclosure,
revise an invention disclosure,
send an invention disclosure to a co-inventor,
view an unsubmitted invention disclosure, and
submit an invention disclosure;
creating an invention disclosure based on an inventor selecting the corresponding option in the accessed invention disclosure template form, with the invention disclosure providing information about an invention;
adding an attachment to the invention disclosure by selecting the corresponding option in the accessed invention disclosure template form, with the attachment providing additional information about the invention and with the attachment being added without the use of a hyperlink,
submitting the invention disclosure by selecting the corresponding option in the accessed invention disclosure template form, with the invention disclosure being submitted along with the attachment over the intranet;
creating a profile of the invention disclosure based upon a technical area relating to the invention disclosure in response to accessing associated personnel information of the inventor;
transmitting a first notification message via e-mail to a first group of users based upon the created profile, the first group of users being within the plurality of users and including a technical review coordinator, the first notification message having a hyperlink to the invention disclosure;
selecting at least one evaluator by the technical review coordinator;
transmitting a second notification message via e-mail to the at least one evaluator, the second notification message having a hyperlink to the invention disclosure;
submitting evaluation comments by the at least one evaluator;
submitting a recommendation of the invention disclosure by the technical review coordinator based upon the evaluation comments; and
transmitting the recommendation of the invention disclosure via e-mail to the first group of users.

12. A method according to claim 11, further comprising:
transmitting a third notification message via e-mail to a second group of users based upon the created profile, the second group of users being within the plurality of users; and
transmitting the recommendation of the invention disclosure via e-mail to the second group of users.

13. A method according to claim 12, wherein transmitting the third notification message is responsive to submission of the invention disclosure.

14. A method according to claim 12, wherein the second group of users comprises a business area manager, a supervisor of the inventor, and the inventor.

15. A method according to claim 11, wherein transmitting the first notification message is responsive to submission of the invention disclosure.

16. A method according to claim 11, wherein the profile comprises a functional manager of the inventor, a patent attorney, a technical review person, and a contracts person if the invention was developed under government funds.

17. A method according to claim 16, wherein the profile further comprises information relating to the inventor including the inventor's employee number, department number, building number, phone number and e-mail address.

18. A method according to claim 11, wherein the first group of users comprises a technical review coordinator, a contract administrator if the invention was developed under government funds, and an intellectual property administrator.

19. A method according to claim 11, further comprising sending a notification message to a co-inventor, the notification message being transmitted via e-mail with a hyperlink to the invention disclosure.

20. An intranet for distributing an invention disclosure comprising:
  at least one computing device comprising a plurality of software modules, said plurality of software modules comprising
    a first software module for accessing an invention disclosure template form over the intranet, with the invention disclosure template form providing the following user options
    create an invention disclosure,
    add attachments to an invention disclosure,
    revise an invention disclosure,
    send an invention disclosure to a co-inventor,
    view an unsubmitted invention disclosure, and
    submit an invention disclosure,
    a second software module for creating an invention disclosure based on a user selecting the corresponding option in the accessed invention disclosure template form, with the invention disclosure providing additional information about an invention,
    a third software module for adding an attachment to the invention disclosure based on the user selecting the corresponding option in the accessed invention disclosure template form, with the attachment providing additional information about the invention and with the attachment being added without the use of a hyperlink,
    a fourth software module for submitting the invention disclosure based on the user selecting the corresponding option in the accessed invention disclosure template form, with the invention disclosure being submitted along with the attachment over the intranet to at least one evaluator via e-mail with a hyperlink to the invention disclosure, and
    a fifth software module for transmitting evaluation comments on the invention disclosure and the attachment by the at least one evaluator via e-mail.

21. An intranet according to claim 20, wherein the intranet includes a plurality of users enrolled therein with each user having associated personnel information stored within the intranet, further comprising:
  a sixth software module for creating a profile of the invention disclosure based upon a technical area relating to the invention disclosure in response to accessing associated personnel information of the inventor; and
  a seventh software module for transmitting a first notification message via e-mail to a first group of users based upon the created profile, the first group of users being within the plurality of users and including a technical review coordinator, the first notification message having a hyperlink to the invention disclosure.

22. An intranet according to claim 21, wherein the at least one evaluator is selected by the technical review coordinator.

23. An intranet according to claim 22, further comprising:
  an eight software module for submitting a recommendation of the invention disclosure by the technical review coordinator based upon the evaluation comments; and
  a ninth software module for transmitting the recommendation of the invention disclosure via e-mail to the first group of users.

24. An intranet according to claim 21, wherein the seventh software module for transmitting the first notification message is responsive to submission of the invention disclosure.

25. An intranet according to claim 21, wherein the profile comprises a functional manager of the inventor, a patent attorney, a technical review person, and a contracts person if the invention was developed under government funds.

26. An intranet according to claim 25, wherein the profile further comprises information relating to the inventor including the inventor's employee number, department number, building number, phone number and e-mail address.

27. An intranet according to claim 21, wherein the first group of users comprises a technical review coordinator, a contract administrator if the invention was developed under government funds, and an intellectual property administrator.

28. An intranet according to claim 27, wherein the first group of users further comprises a business area manager, a supervisor of the inventor, and the inventor.

29. An intranet according to claim 20, wherein the fourth software module comprises instructions for sending a notification message to a co-inventor, the notification message being transmitted via e-mail with a hyperlink to the invention disclosure.

30. A computer-readable medium having computer-executable instructions for causing a computer to perform steps comprising:
  accessing an invention disclosure template form over the intranet, with the invention disclosure template form providing the following user options
    create an invention disclosure,
    add attachments to an invention disclosure,
    revise an invention disclosure,
    send an invention disclosure to a co-inventor,
    view an unsubmitted invention disclosure, and
    submit an invention disclosure;
  creating an invention disclosure based on a user selecting the corresponding option in the invention disclosure template form, with the invention disclosure providing additional information about an invention;
  adding an attachment to the invention disclosure based on the user selecting the corresponding option in the accessed invention disclosure template form, with the attachment providing additional information about the invention and with the attachment being added without the use of a hyperlink;
  submitting the invention disclosure based on the user selecting the corresponding option in the accessed invention disclosure template form, with the invention disclosure being submitted along with the attachment over the intranet to at least one evaluator via e-mail with a hyperlink to the invention disclosure; and
  transmitting evaluation comments on the invention disclosure and the attachment by the at least one evaluator via e-mail.

31. A computer-readable medium according to claim 30, wherein the intranet includes a plurality of users enrolled therein with each user having associated personnel information stored within the intranet, the computer-readable medium further causing the computer to perform steps comprising:

generating a profile of the invention disclosure, the profile being based upon a technical area relating to the invention disclosure in response to accessing associated personnel information of the inventor; and generating a first notification message to be transmitted via e-mail to a first group of users based upon the created profile, the first group of users being within the plurality of users and including a technical review coordinator, the first notification message having a hyperlink to the invention disclosure.

32. A computer-readable medium according to claim 31, further causing the computer to perform steps comprising selection of the at least one evaluator by the technical review coordinator.

33. A computer-readable medium according to claim 32, further causing the computer to perform steps comprising:

generating a recommendation of the invention disclosure submitted by the technical review coordinator based upon the evaluation comments; and generating an e-mail message of the recommendation of the invention disclosure to be transmitted to the first group of users.

34. A computer-readable medium according to claim 31, wherein the profile comprises data representing a functional manager of the inventor, a patent attorney, a technical review person, and a contracts person if the invention was developed under government funds.

35. A computer-readable medium according to claim 34, wherein the profile further comprises data representing information relating to the inventor including the inventor's employee number, department number, building number, phone number and e-mail address.

36. A computer-readable medium according to claim 31, wherein the first group of users comprises a technical review coordinator, a contract administrator if the invention was developed under government funds, and an intellectual property administrator.

37. A computer-readable medium according to claim 36, wherein the first group of users further comprises a business area manager, a supervisor of the inventor, and the inventor.

38. A computer-readable medium according to claim 31, wherein generating the profile comprises generating a notification message to be transmitted to a co-inventor, the notification message to be transmitted via e-mail with a hyperlink to the invention disclosure.

* * * * *